United States Patent [19]

Beck et al.

[11] Patent Number: 4,628,881
[45] Date of Patent: Dec. 16, 1986

[54] PRESSURE-CONTROLLED FUEL INJECTION FOR INTERNAL COMBUSTION ENGINES

[75] Inventors: Niels J. Beck; Michael A. Calkins; William E. Weseloh; Robert L. Barkhimer, all of San Diego, Calif.

[73] Assignee: BKM, Inc., San Diego, Calif.

[21] Appl. No.: 700,692

[22] Filed: Feb. 12, 1985

Related U.S. Application Data

[63] Continuation-in-part of Ser. No. 418,688, Sep. 16, 1982, abandoned.

[51] Int. Cl.$^4$ ............................................. F02M 47/02
[52] U.S. Cl. ..................... 123/447; 123/446; 123/458; 123/501; 239/91; 239/96
[58] Field of Search ............... 123/447, 446, 458, 459, 123/501, 502; 239/88-92, 96

[56] References Cited

U.S. PATENT DOCUMENTS

| | | | |
|---|---|---|---|
| 2,985,378 | 5/1961 | Falberg | 239/96 |
| 3,587,547 | 6/1971 | Hussey et al. | 123/447 |
| 3,921,604 | 11/1975 | Links | 123/458 |
| 4,069,800 | 1/1978 | Kanda et al. | 123/447 |
| 4,219,154 | 8/1980 | Luscomb | 239/91 |
| 4,372,272 | 2/1983 | Walter et al. | 123/447 |
| 4,378,775 | 4/1983 | Straubel et al. | 123/458 |
| 4,381,750 | 5/1983 | Funada | 123/447 |
| 4,396,151 | 8/1983 | Kato et al. | 239/89 |
| 4,414,940 | 11/1983 | Loyd | 123/300 |

Primary Examiner—Magdalen Y. C. Greenlief
Attorney, Agent, or Firm—Gene W. Arant

[57] ABSTRACT

An electronically controlled fuel supply system for an internal combustion engine. The timing of the commencement of fuel injection into each combustion chamber is not fixed relative to the rotational position of the camshaft or other engine components. A unit injector assembly associated with each combustion chamber includes a control module and an accumulator type injector module. The control module contains a solenoid valve and, in some embodiments, a hydraulic pressure intensifier. The accumulator type injector module contains an injector nozzle, a hydraulic accumulator, and a non-return valve for admitting liquid fuel under pressure into the accumulator. In operation, an electrical control system supplies an electrical signal to the control module an appreciable portion of the engine cycle in advance of the time when fuel injection is to be initiated in the particular combustion chamber. In response to that electrical signal, the solenoid valve admits liquid fuel under pressure into the hydraulic pressure intensifier. The output of the intensifier provides a metering and intensifying chamber in which the pressure of the fuel continues to increase until near the time when fuel injection is to commence. As pressure builds up, fuel flows through the non-return valve into the accumulator. Under control of the electrical signal the solenoid valve then shuts off the flow of liquid fuel into the intensifier. The transfer of fuel under high pressure from the intensifier chamber to the accumulator is discontinued due to the non-return valve, and the injector nozzle then fires. Alternatively, the solenoid valve admits liquid fuel under pressure directly through the non-return valve into the accumulator, with the turn-off of the solenoid valve causing the injector nozzle to fire. The control system may be utilized for operating the engine in a modified engine cycle in which firing cycles are selectively eliminated. The control system may also be utilized for controlling different cylinders of an engine differently from each other. The control of engine power is accomplished by either electrical or hydraulic means, or a combination thereof, and does not involve any mechanical adjustments within the unit injector assemblies.

68 Claims, 25 Drawing Figures

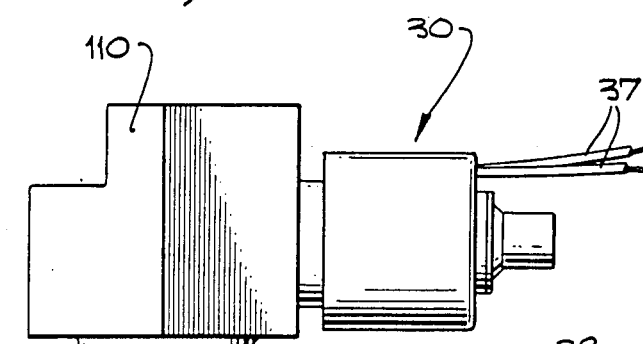
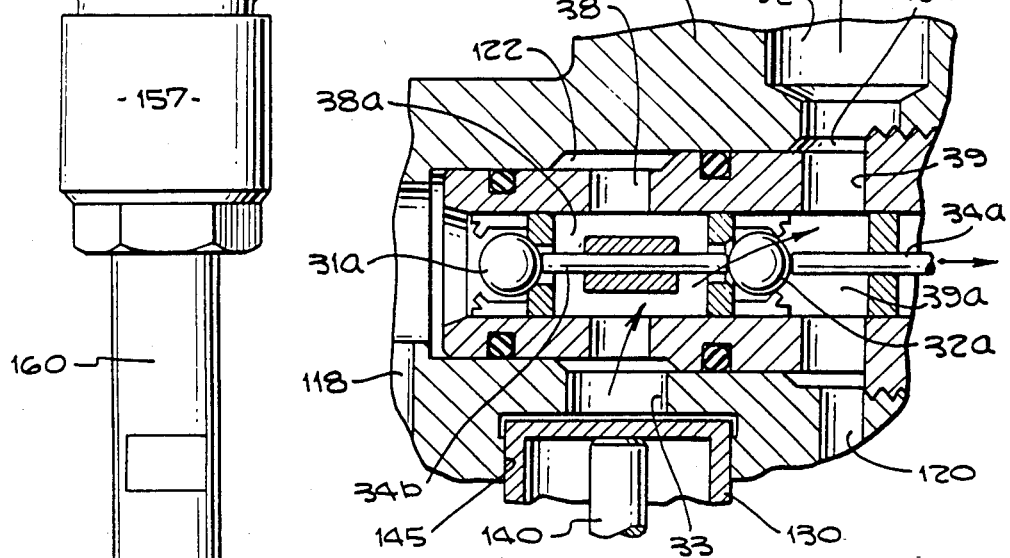
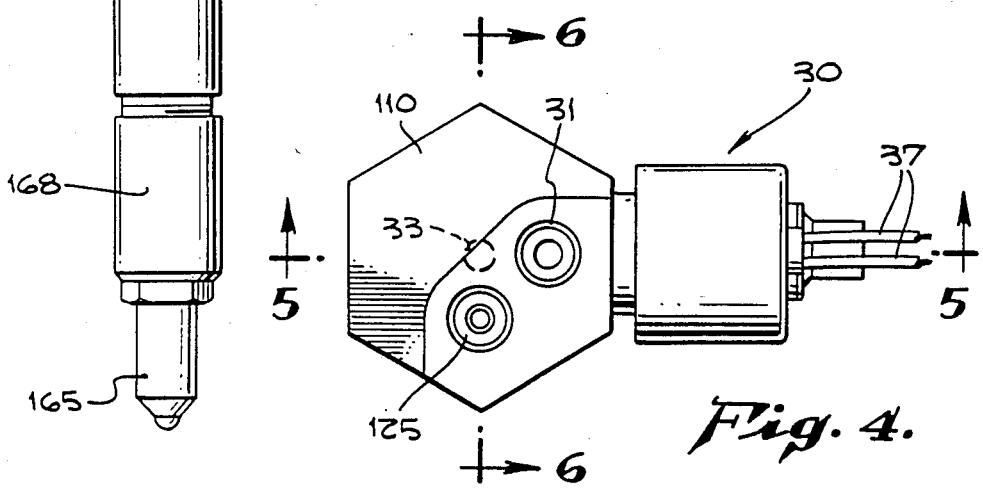

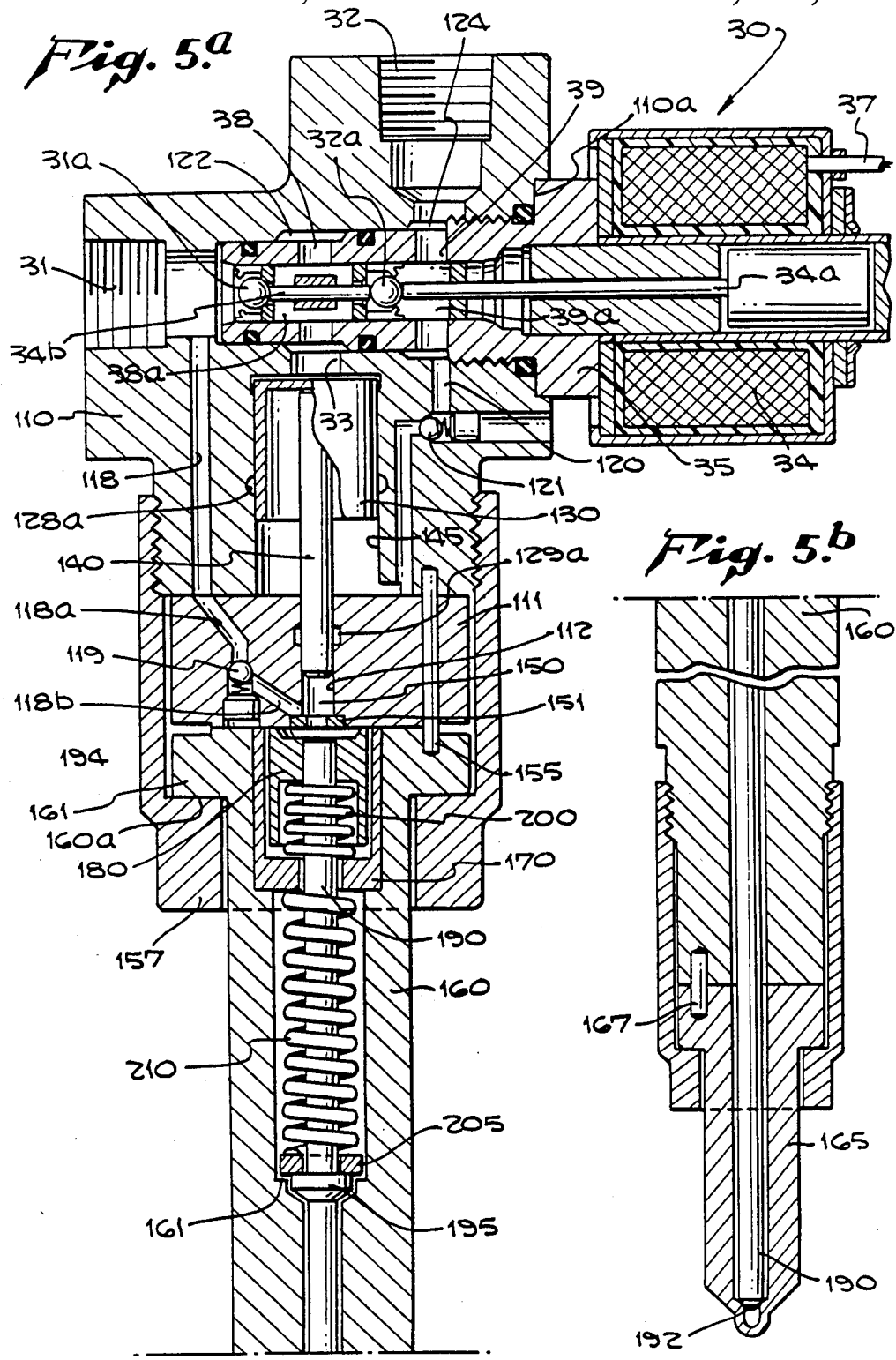

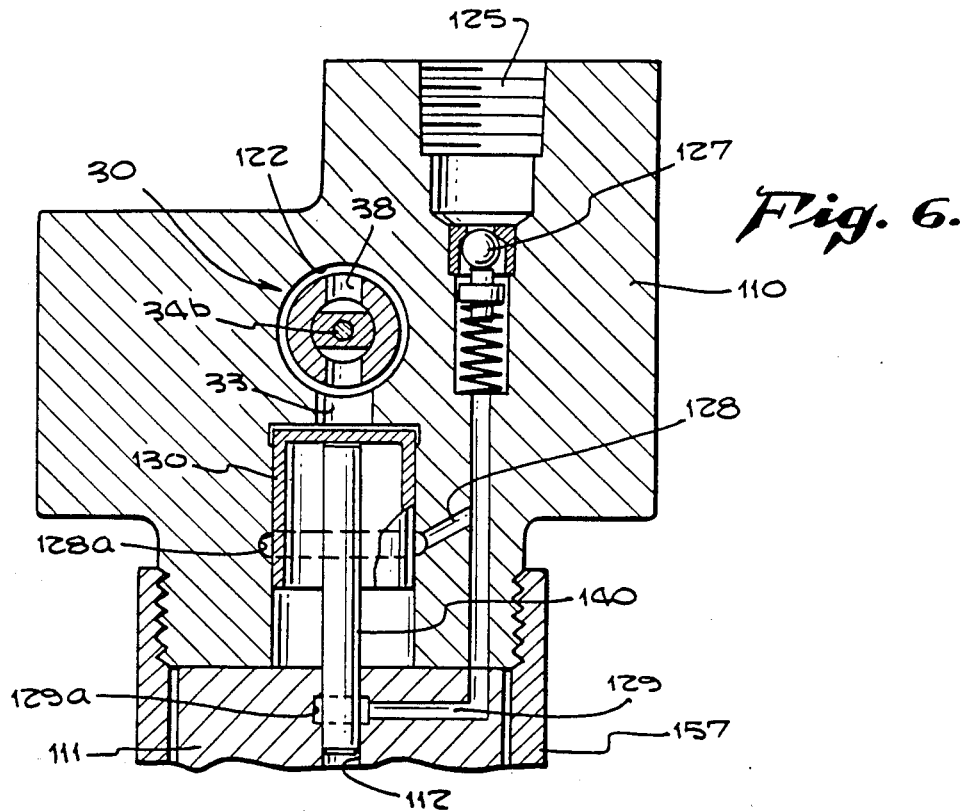
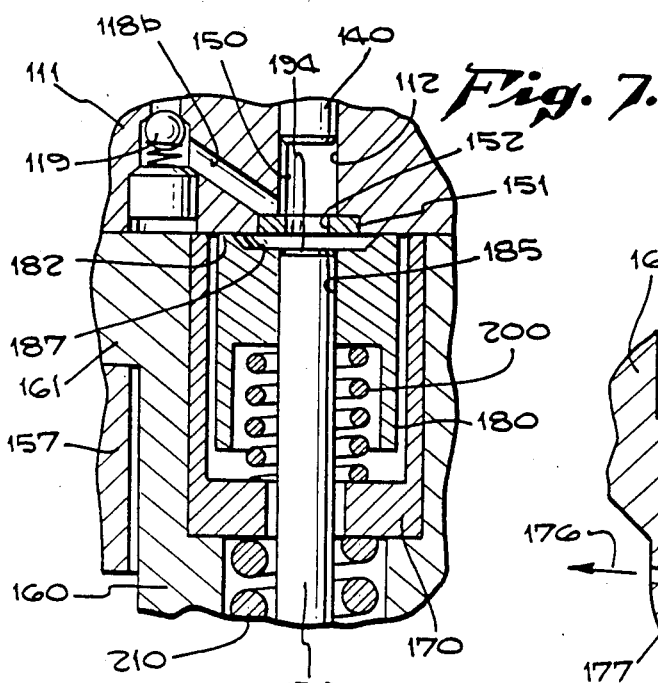
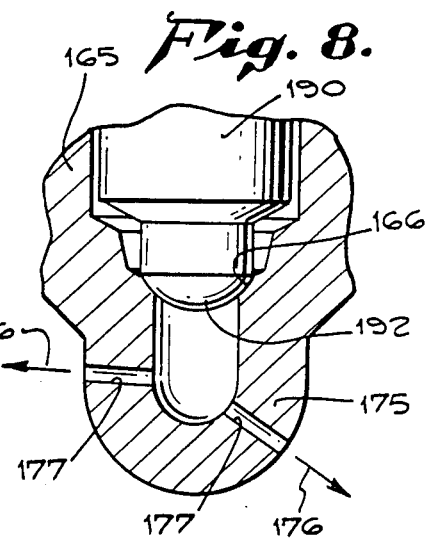

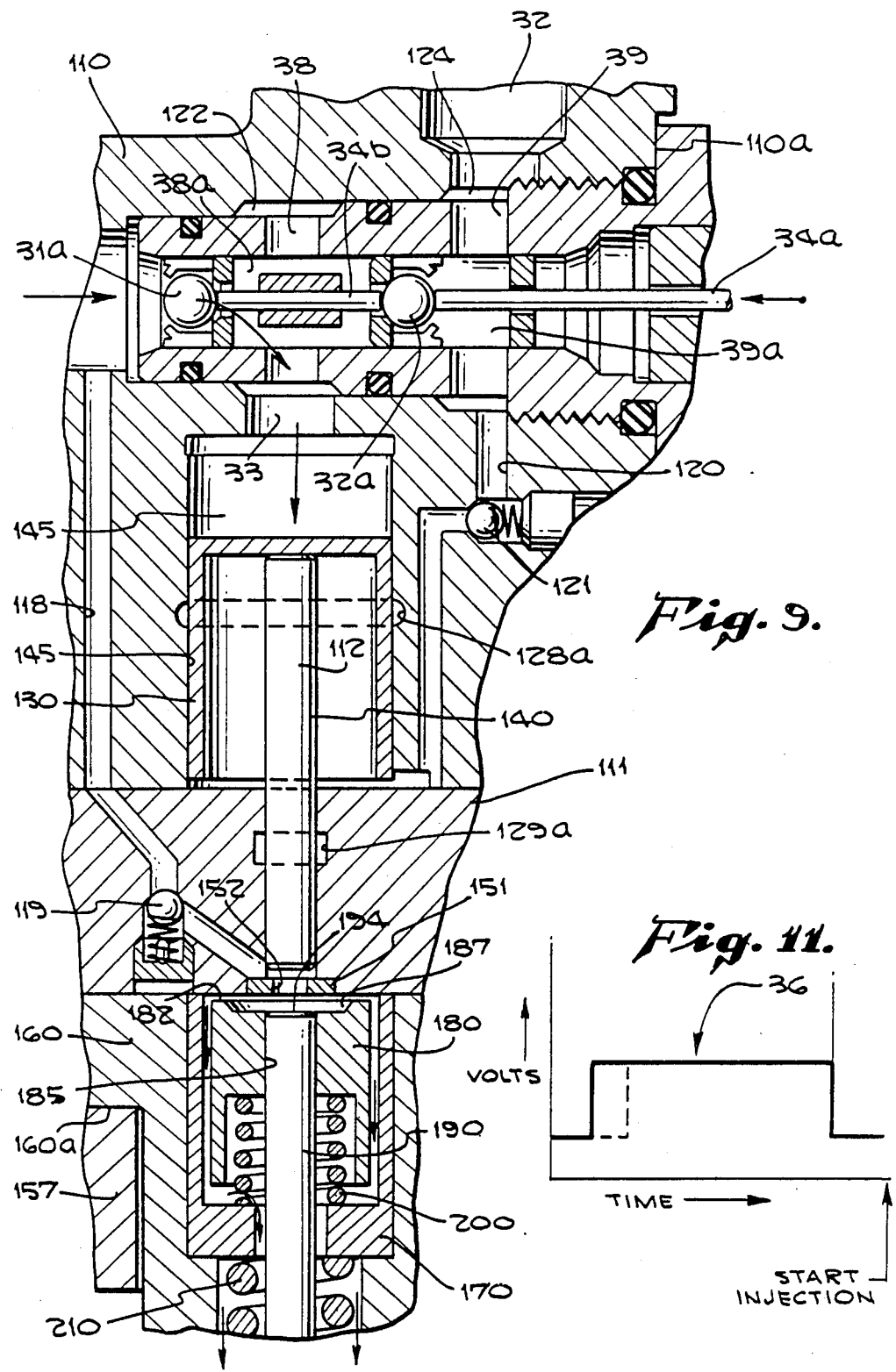

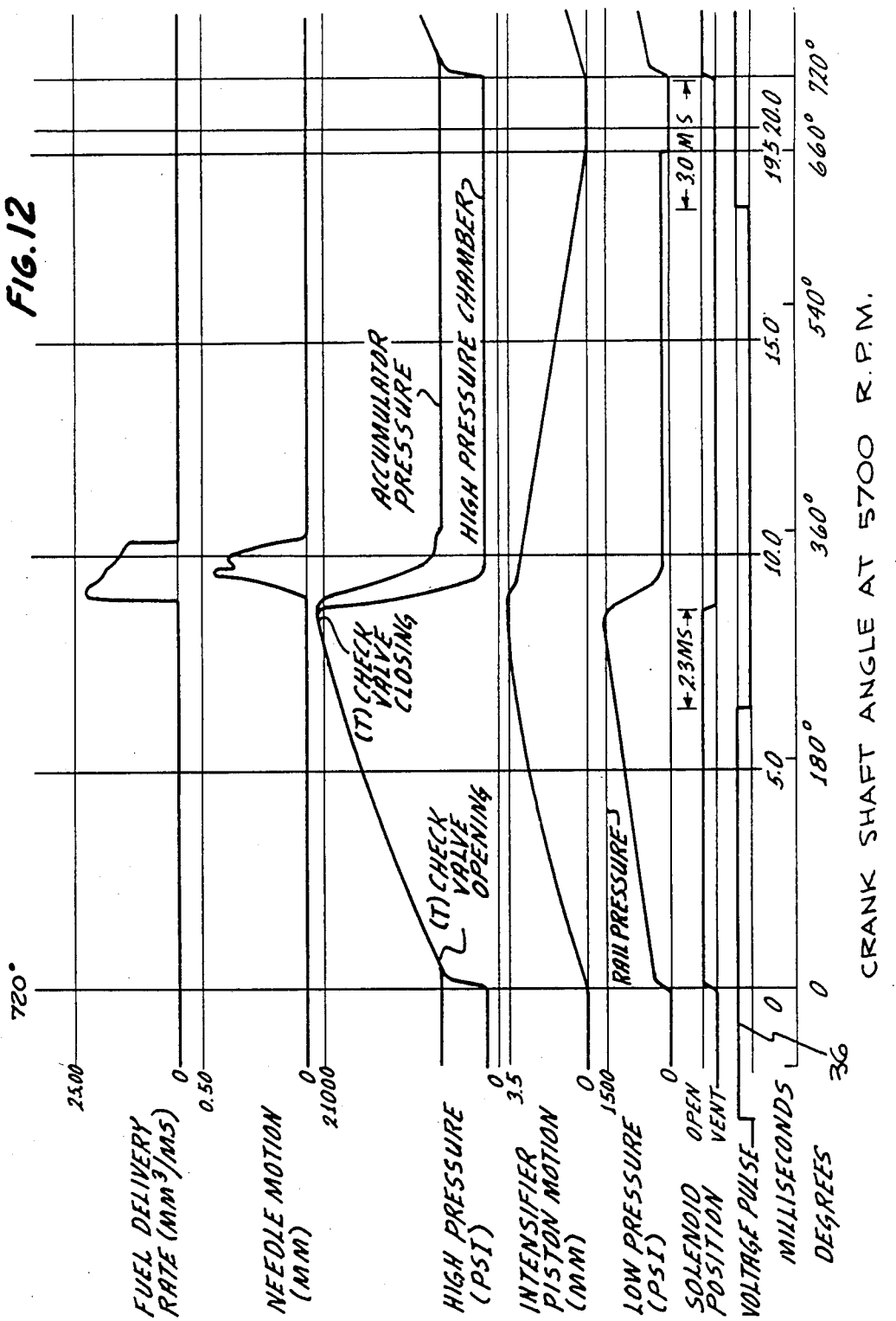

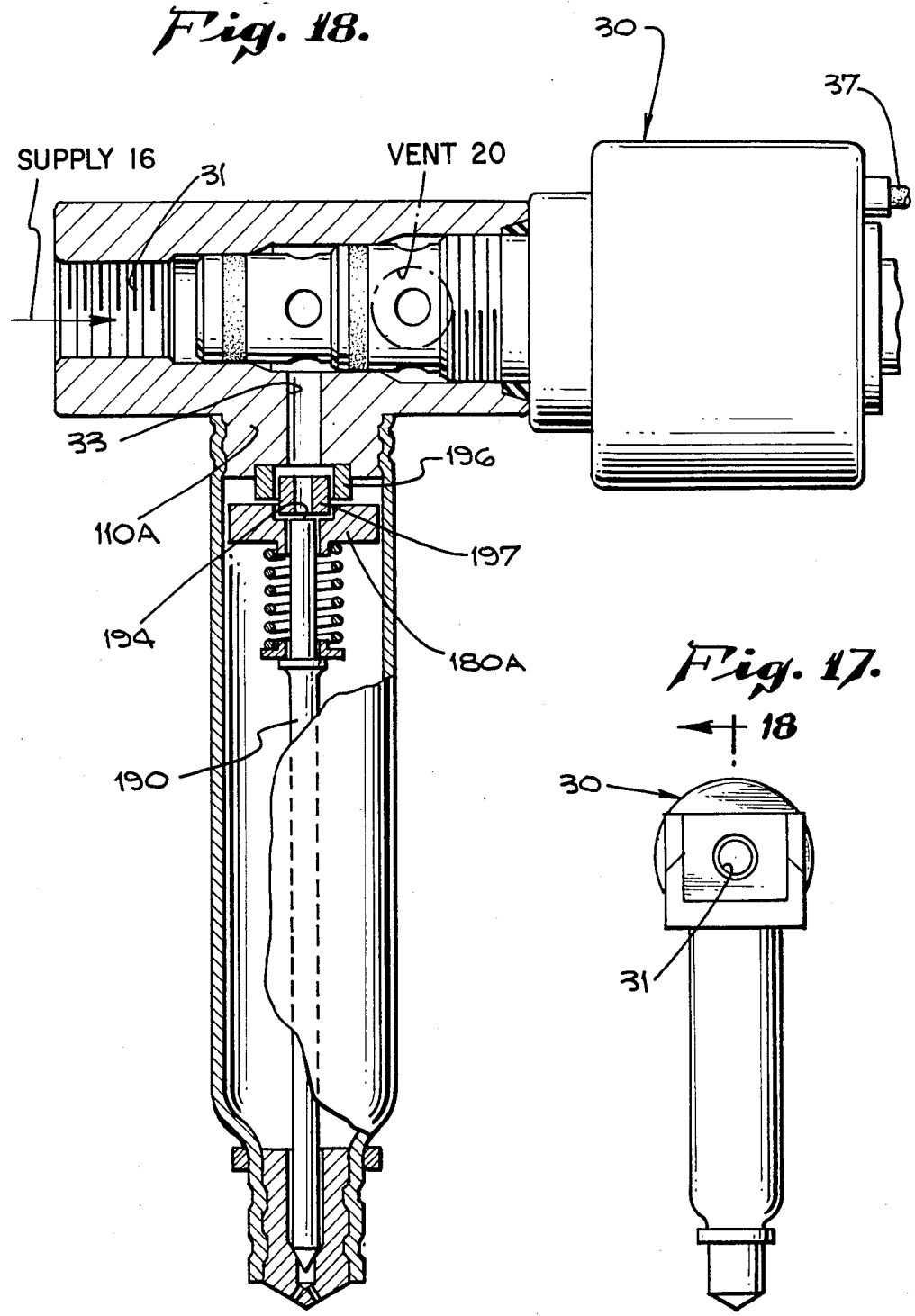

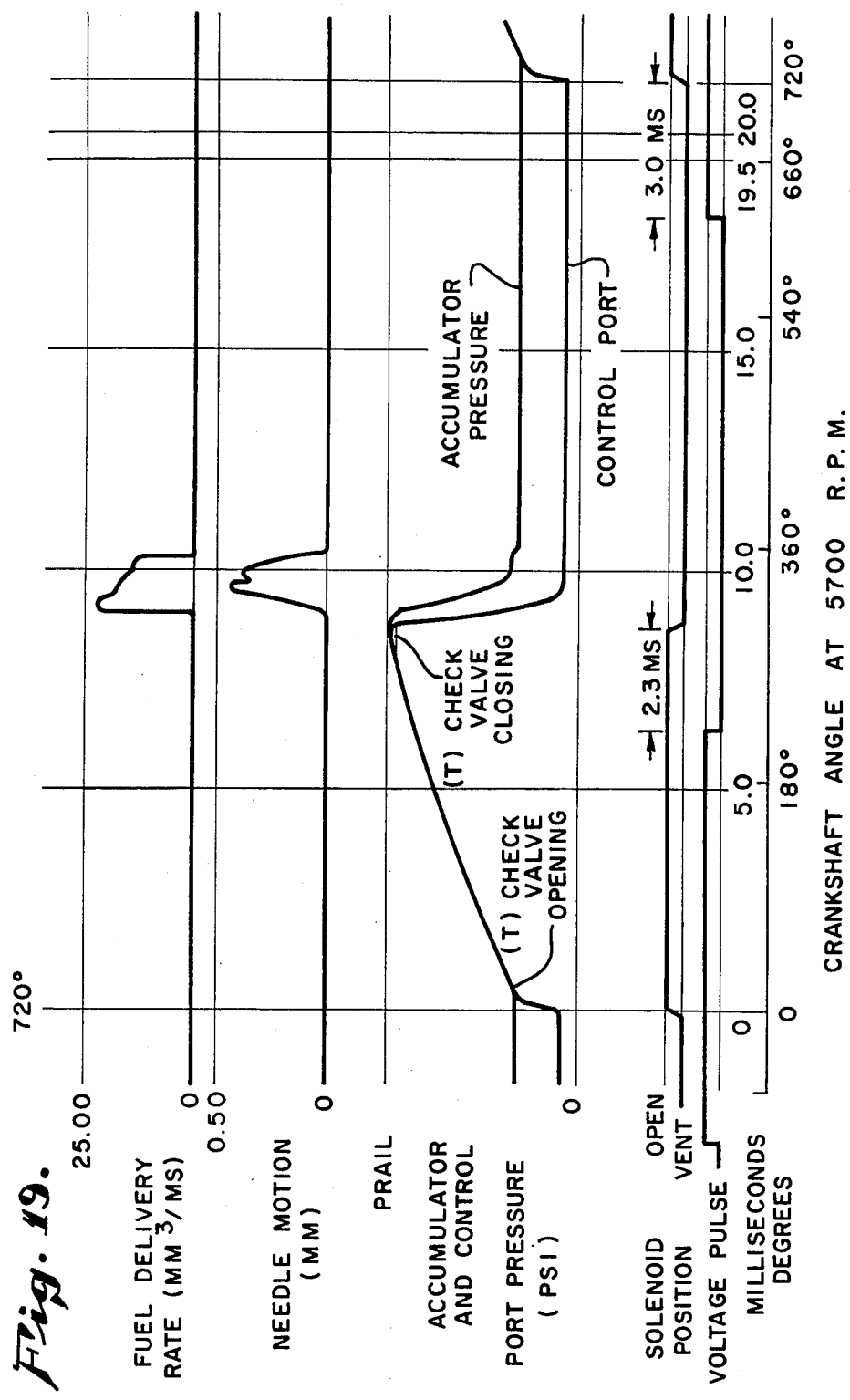

PRESSURE-CONTROLLED FUEL INJECTION FOR INTERNAL COMBUSTION ENGINES

RELATED APPLICATION

This application is a continuation-in-part of copending U.S. Patent Application Ser. No. 418,688 filed Sept. 16, 1982 by the present applicants and Christian G. Goohs, and which was assigned to the same assignee, BKM, Inc., as is the present application. The prior application has subsequently been abandoned.

I. BACKGROUND OF THE INVENTION AND PRIOR ART

While the present invention relates to both diesel engines and Otto cycle (gasoline) engines, the apparatus that was initially developed was designed specifically for diesel engines.

Internal combustion engines of the diesel type are characterized by their injection of a carefully premeasured charge of liquid fuel directly into the compression-heated air of a combustion chamber formed by the rapid, inward movement of a piston in its cylinder. This is no premixing of fuel and air prior to injection.

This heterogeneous mixture of fuel and air at the time of injection which occurs when the piston is near top-dead-center of its compression stroke, has created challenges for diesel engineers since the invention of the engine by Rudolf Diesel in the 1890's. These include the accurate control of beginning and ending of injection, the rate at which the fuel is injected, the shape and direction of the injection spray, and the formation and control of the hydraulic pressure under which the fuel is forced into the engine cylinder. A diesel fuel system, in addition to providing the correct volume of fuel charge at each injection for all speed and load conditions, must also control fuel delivery for cold starting of the engine, govern idle and maximum speeds, and have fail-safe features to prevent engine "runaway" from occurring. In summary, the fuel injection system has for nearly a century been considered to be the heart of a diesel engine.

Both the technical and patent literature is replete with means suggesting solutions to above mentioned fuel injection related problems inherent in diesel engines. Various practical solutions have come about through the years as new technologies emerge in materials, manufacturing techniques, fuel chemistry and production processes. In recent times the newest technological contributions are in the areas of electronics and microprocessors whereby it now becomes feasible to control functions of engine operation heretofore considered impossible.

A study of prior art and published literature provides a well documented record of the progress in diesel fuel injection systems. One reference in this area is Burman and DeLuca, *Fuel Injection and Controls for Internal Combustion Engines;* 1962, which contains an historical section listing fuel injection developments as described mostly by patent literature. It is by no means complete, yet its offering is broad enough to show the devious and myriad attempts to solve the problems known to those skilled in the art.

Other relevant technical references include the following papers:

1. K. Komiyama, *Electronically Controlled High Pressure Injection System for Heavy Duty Diesel Engine KOMPICS,* Soc. of Auto. Engrs. Paper No. 810997, 1981.
2. J. Akagi, *A New Accumulator Fuel Injection System for Direct Injection Diesel Engines,* Soc. of Auto. Engrs. Paper No. 821114, 1982.
3. Ralph J. Hooker, "Orion—A Gas Generator Turbocompound Engine", *Transactions,* Soc. of Auto. Engrs., Vol. 65, 1957, pps 15-17.

The above references offer background falling within the scope of this patent, namely accumulator-type injectors with pressure multipliers. A worthwhile summary of commercially available diesel fuel systems may be found in Robert Brady, *Diesel Fuel Systems,* Reston, 1981.

From the earliest days of diesel engines, troubles were encountered with the fuel lines between the injection pump and nozzles. The unit injector combines the pump and nozzle, eliminates the high pressure lines, and thus offers a solution to the problem.

Many diesel engines are manufactured having a single cylinder, and the required fuel supply system is then relatively simple. Nevertheless, in addition to the injector associated with the one cylinder, the entire fuel supply system includes numerous additional components. For multi-cylinder diesel engines the complete fuel supply system becomes relatively complex.

Fuel injectors are generally by far the most expensive component parts of a diesel engine. The reason is that they carry fuel pressures of many thousands of pounds per square inch, their mechanical operation occurs very rapidly, and in order to control both the quantity of the fuel charge and the timing of its injection with a desired level of precision, the mechanical parts of the injector mechanism itself must be manufactured with extremely precise tolerances.

In the diesel fuel injection systems currently in commercial use, the controls for the system are essentially mechanical in nature. Many different mechanical arrangements have been used for controlling the fuel supply to the engine in order to satisfy the engine speed and load conditions.

Pertinent prior art United States patents include the following:

Eichelberg, U.S. Pat. No. 2,283,725, 1942;
Falberg, U.S. Pat. No. 2,985,378, 1961;
Links, U.S. Pat. No. 3,835,829, 1974;
Luscomb, U.S. Pat. No. 4,219,154, 1980.

Eichelberg is an early example disclosing the use of an accumulator type injector in a fuel injection system.

The Falberg patent is entitled "Accumulator Type Injection Apparatus". It discloses a piston type metering pump that is contained in the same housing with a hydraulic accumulator and an injection valve. The fuel pump includes a pump chamber 12 which delivers a fuel charge on each stroke of the pump, the quantity of the fuel charge being adjustable by mechanical rotation of the pump plunger. A housing 20 provides an accumulator chamber 21. Within the accumulator chamber a one-way check valve 24 controls the admission of the fuel charge from the pump chamber 12 into the accumulator chamber 21. At the lower end of the accumulator, an outlet 29 communicates with the spray tip 22 which is provided with the usual injection orifices 23. An injection valve 28 (or needle valve member) is normally in contact with a valve seat 30 so as to close off the accumulator outlet 29. Transfer of a fuel charge from pump chamber 12 through the check valve 224 into the accumulator chamber 21 raises the internal pressure in the accumulator. When the pump stroke ends by opening a spill port, differential pressure acting on the needle valve member causes the injector to fire, delivering the fuel in a dispersed configuration through orifices 23 of the spray tip 22.

The Links U.S. Pat. No. 3,835,829 shows a fuel pump which operates intermittently, with time spaced injection strokes that provides a series of injection pulses of the fuel. During the time interval between successive injection strokes, the work chamber of the pump is charged with pressurized fuel through a supply valve, so that the charging period of the pump is substantially longer than the injection period. The supply valve shown in this reference is a three-way solenoid valve.

The Luscomb U.S. Pat. No. 4,219,154 shows a fuel injection system which is electronically controlled by means of a solenoid valve. Fuel supplied through the valve is fed to a hydraulic intensifier having large and small cylinders with the smaller cylinder 66 being movable within a fuel metering chamber 50. The pressure of the fuel in chamber 50 is amplified to several times the supply pressure as it is introduced into a fuel injector 78 for discharge into the combustion chamber. The injection event proceeds essentially concurrently with the retracting motion of the intensifier pistons.

The present invention relates to Otto cycle (gasoline) engines as well as to diesel engines.

II. SUMMARY OF THE INVENTION

According to the present invention, a fuel system is provided in which the hydraulic control of the metering of the fuel charge is accomplished by adjusting the peak injection pressure and minimum injection pressure of an accumulator type nozzle. The pressure level of the accumulator type injector and the resulting metering of the fuel charge to be injected by the accumulator type nozzle is accomplished by either (1) adjusting the output pressure of a pump that is used as a common source (common rail) for all injector assemblies with constant fill-valve on-times, or by (2) variable fill-valve on-times at constant rail pressure, or by (3) a combination of (1) and (2). This method of pressure metering permits time separation of the filling event from the injection event. The pressure adjustment can be made for all cylinders by means of the common rail or for individual cylinders by the on-time of the fill-valve. Since there is no mechanical control inside the injector assembly of fuel volume or pump displacement, a pressure controlled system is provided.

An important feature of the invention is that metering of the fuel charge is controlled, and adjusted as desired, without making any mechanical adjustment within the mechanism of the unit injector assembly. Instead, desired adjustments in the fuel charge to be metered are accomplished either hydraulically or electrically, or by a combination of hydraulic and electrical means outside of the unit injector assembly.

According to the present invention the unit injector assembly includes an injector of the accumulator type, a non-return valve controlling the fuel input to the accumulator injector, and a thre-way solenoid-controlled valve which operates to admit the fuel charge to the unit injector and to initiate injection when the supply pressure is removed.

When the control adjustment of the fuel charge is accomplished electrically, it is done simply by varying the time interval throughout which the solenoid valve is in the open position during each cycle of engine operation. Specifically, by keeping the solenoid valve open longer, the pressure level supplied to the accumulator injector is greater, and the quantity of fuel charge delivered to the accumulator is increased. Conversely, by reducing the time interval throughout which the solenoid valve is open to rail pressure and closed to vent pressure, the fuel charge may be decreased.

Where the invention is applied to a multi-cylinder engine, the main adjustment in the metering of the fuel is preferably accomplished by adjusting the pressure of the common fuel supply source, while changes in the timing of the electrical control signals may be made differently for the different cylinders in order to equalize the performance of all cylinders and thus optimize the performance of the engine as a whole.

Another feature of the invention is the ability to precisely control the time when fuel injection is to occur, by controlling the turn-off of the solenoid valve.

Still another feature of the present invention is the provision of an improved accumulator type fuel injector that is equipped with a non-return valve at its fuel input, and which incorporates various improvements in its structure and mode of operation. The quantity of fuel injected and the pressure at which the fuel is injected into the combustion chamber of the engine are controlled by selecting the volume of the accumulator chamber and controlling the maximum and minimum pressures within the accumulator chamber.

As a further feature of the invention, an improved control module is provided in which a three-way solenoid valve and a pressure intensifier are contained in a single housing, each having a number of improved features of structure and operation.

In a particular form of the invention which is especially adapted for diesel engines, the unit injector assembly includes a pressure intensifier, and not only operates at a very high pressure, injecting a fuel charge in an extremely fast and precise manner, but also is supplied from a relatively low-pressure fuel supply source. In this form of the invention, there may if desired be two separate sources of hydraulic control—one for the liquid fuel which is supplied at a selected pressure through a check-valve to the high intensity chamber of the pressure intensifier, and the other simply as a source of energy which supplies liquid to the low-pressure chamber of the intensifier. Alternatively, both may be provided by the common rail fuel supply source.

In a modified form of the invention the unit injector assembly includes two control valves operating in cascase, one being a three-way master solenoid valve and the other a slave valve.

In an alternate form of the invention the unit injector assembly does not include an intensifier. The maximum pressure that can then be applied to an injector is the common supply or "common rail" pressure. This form of the invention is particularly suitable for spark ignition engines such as gasoline engines.

III. ADVANTAGES OF THE INVENTION

The invention provides a cost-effective, practical means for precise control and very high pressure fuel injection in diesel engines. Benefits which result from high pressure and precise control are improved fuel economy, lower exhaust emissions, and reduced stress on injection-system components. Furthermore the system is very simple, and permits taking full advantage of the capabilities of present day electronic technology. A single electric signal to a unit injector results in the initiation of injection. Injection subsequently terminates without any additional signal. The termination of injection without a second signal is inherent in the system.

A particular advantage of the invention is that the size or quantity of the fuel charge injected is independent of the engine speed, and the fuel charge can be injected in a very short time independent of nozzle fill-valve on-time.

The invention is equally advantageous for gasoline or other spark-ignition engines. It provides precise control of the quantity and timing of the fuel charges that are injected, is capable of infinitely variable adjustments because of being electronically based, and at the same time requires only a minimum amount of energy to drive the fuel system itself. The invention is also characterized by minimal operating problems of a mechanical nature.

Another advantage of the invention is the ability to inject fuel at a variety of locations in the engines such as air inlet, throttle body, intake port, intake manifold, or directly into the cylinder. The ability to inject in a very short time interval permits the use of the technique of "skip-fire" or to selectively prevent fuel injection for a single engine cycle thereby improving engine operating efficiency particularly at reduced engine power levels.

IV. DRAWING SUMMARY

FIG. 3 is a side elevational view of a unit injector assembly in accordance with the present invention;

FIG. 4 is a top plan view of the unit injector assembly of FIG. 3;

Figure 13:
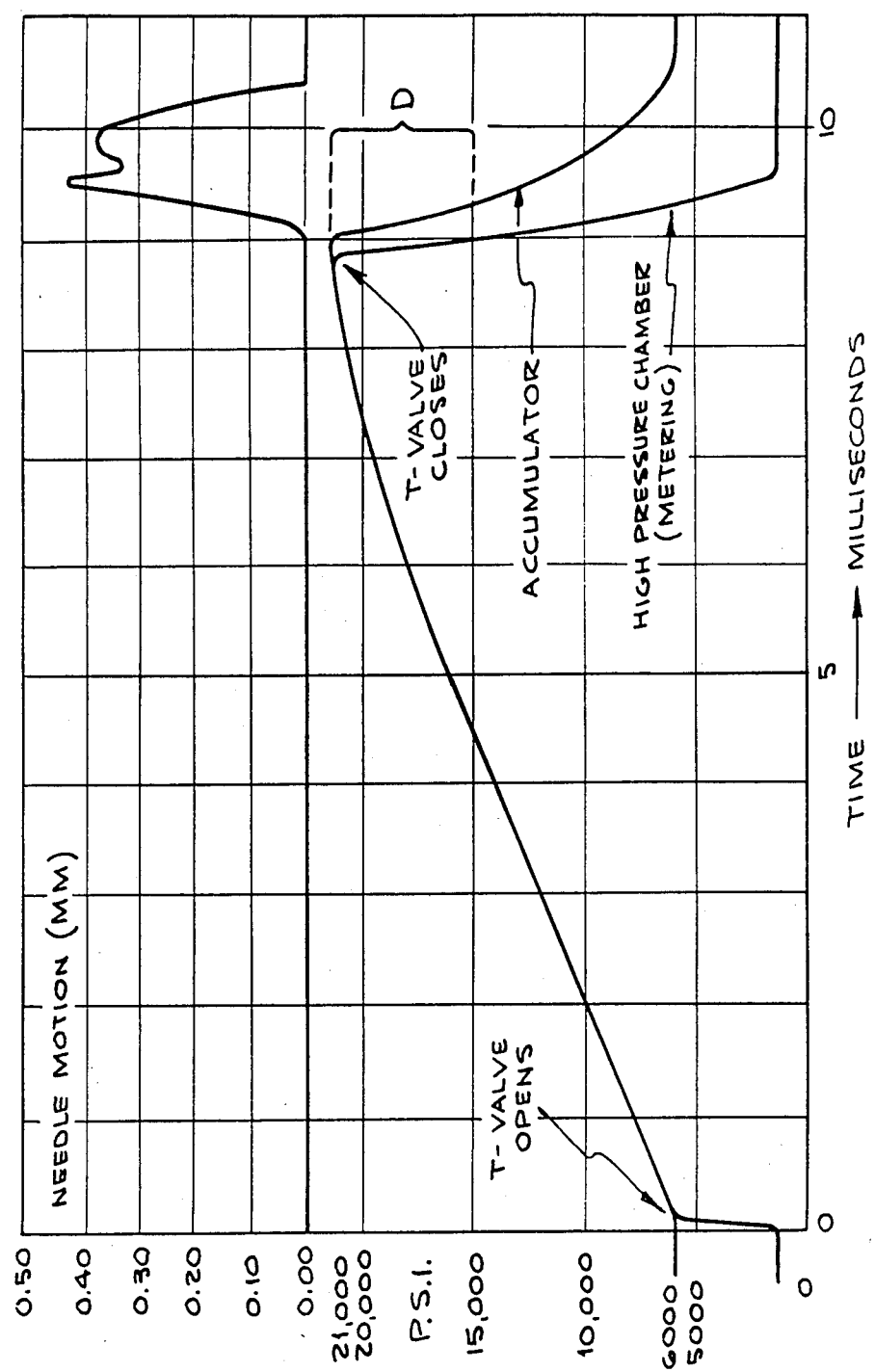
Figure 14:
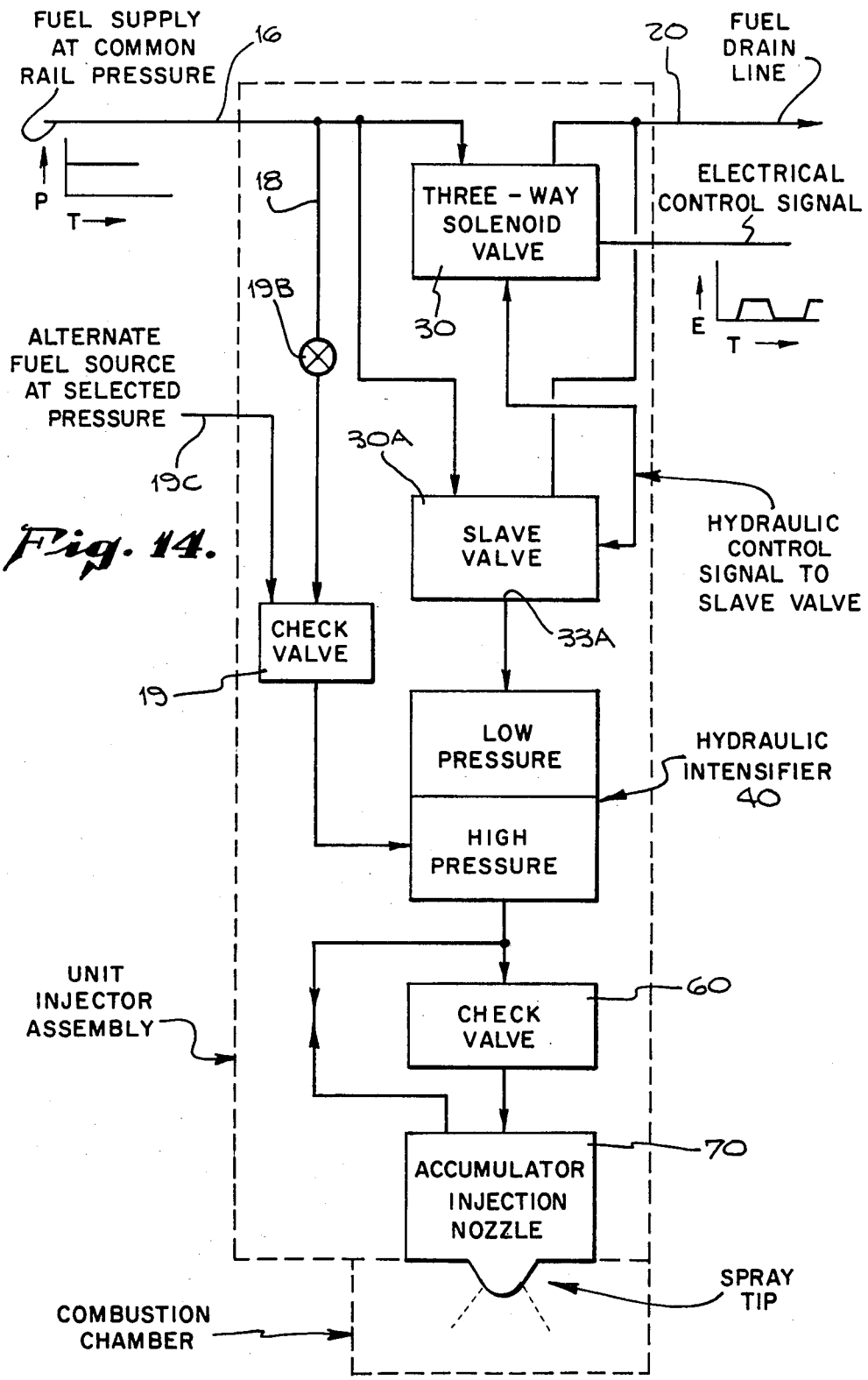
Figure 16:
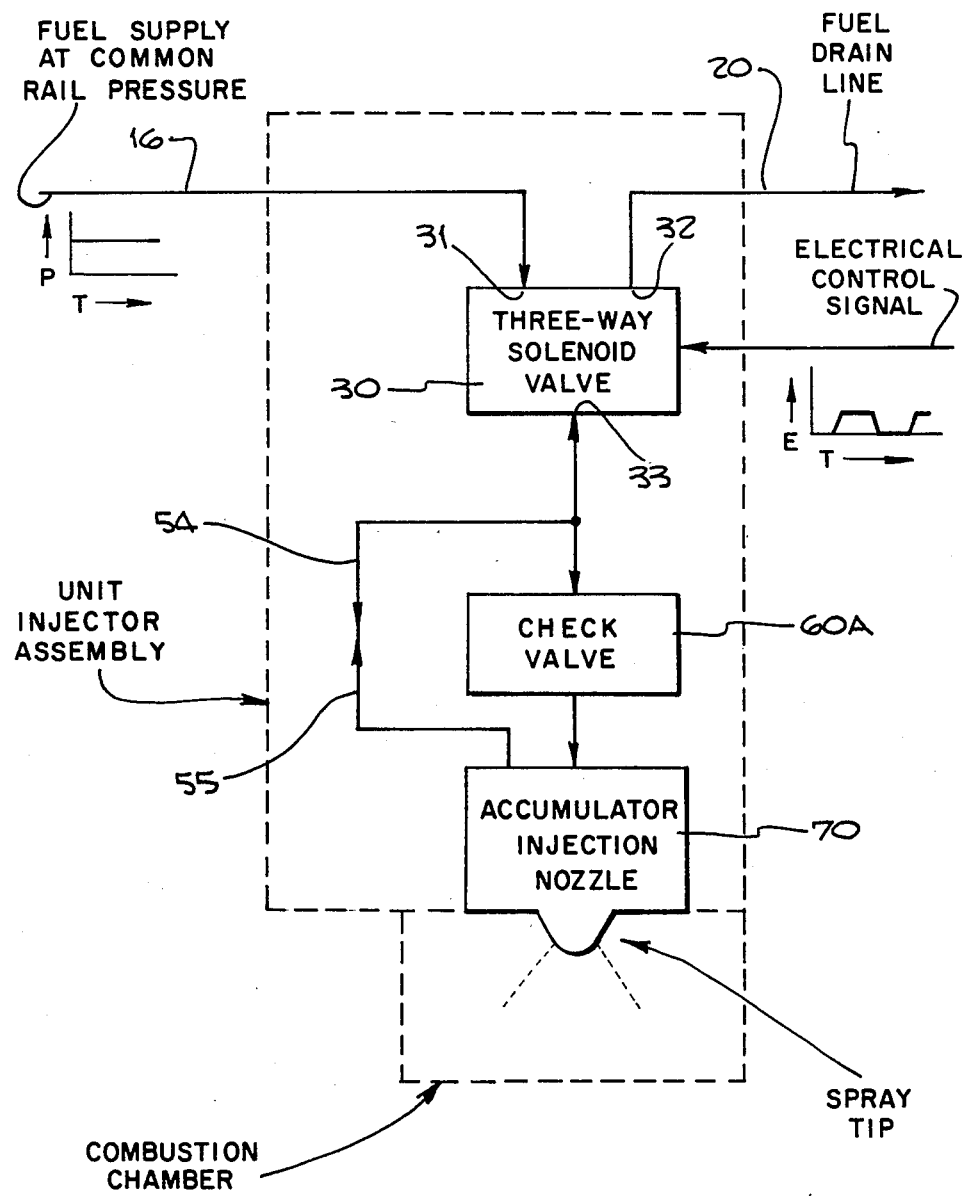
Figure 20:
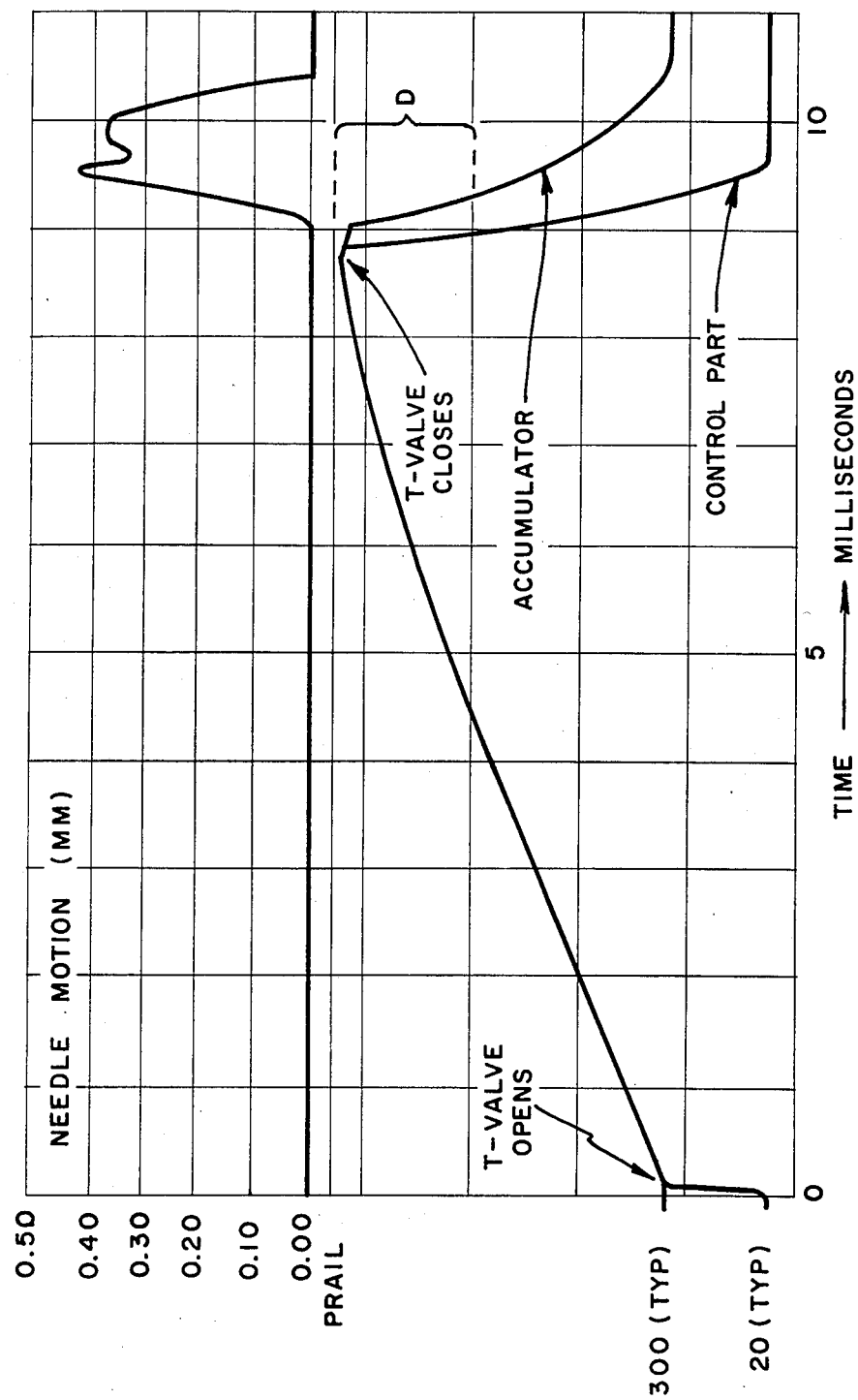
Figure 21:
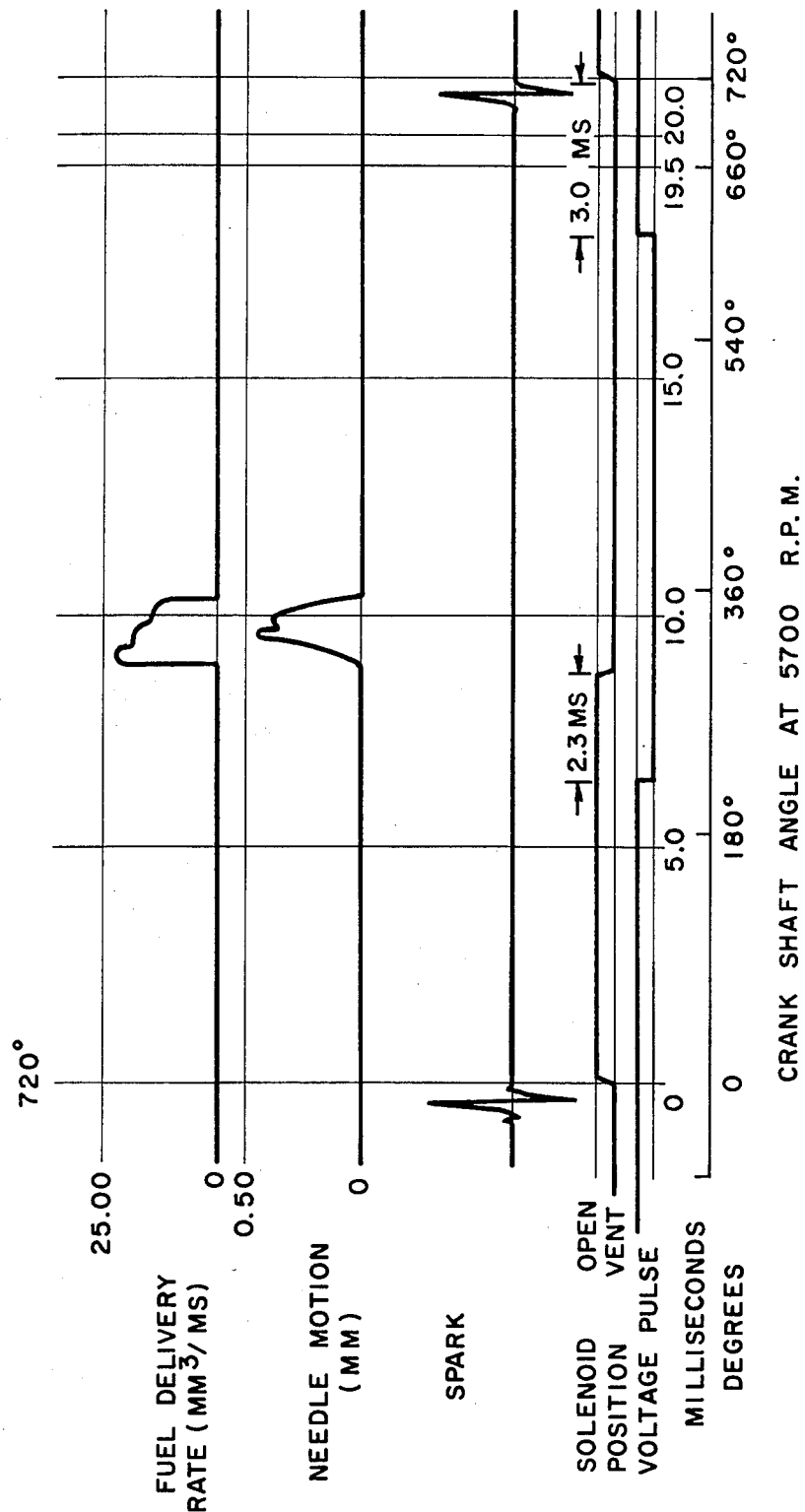
Figure 22:
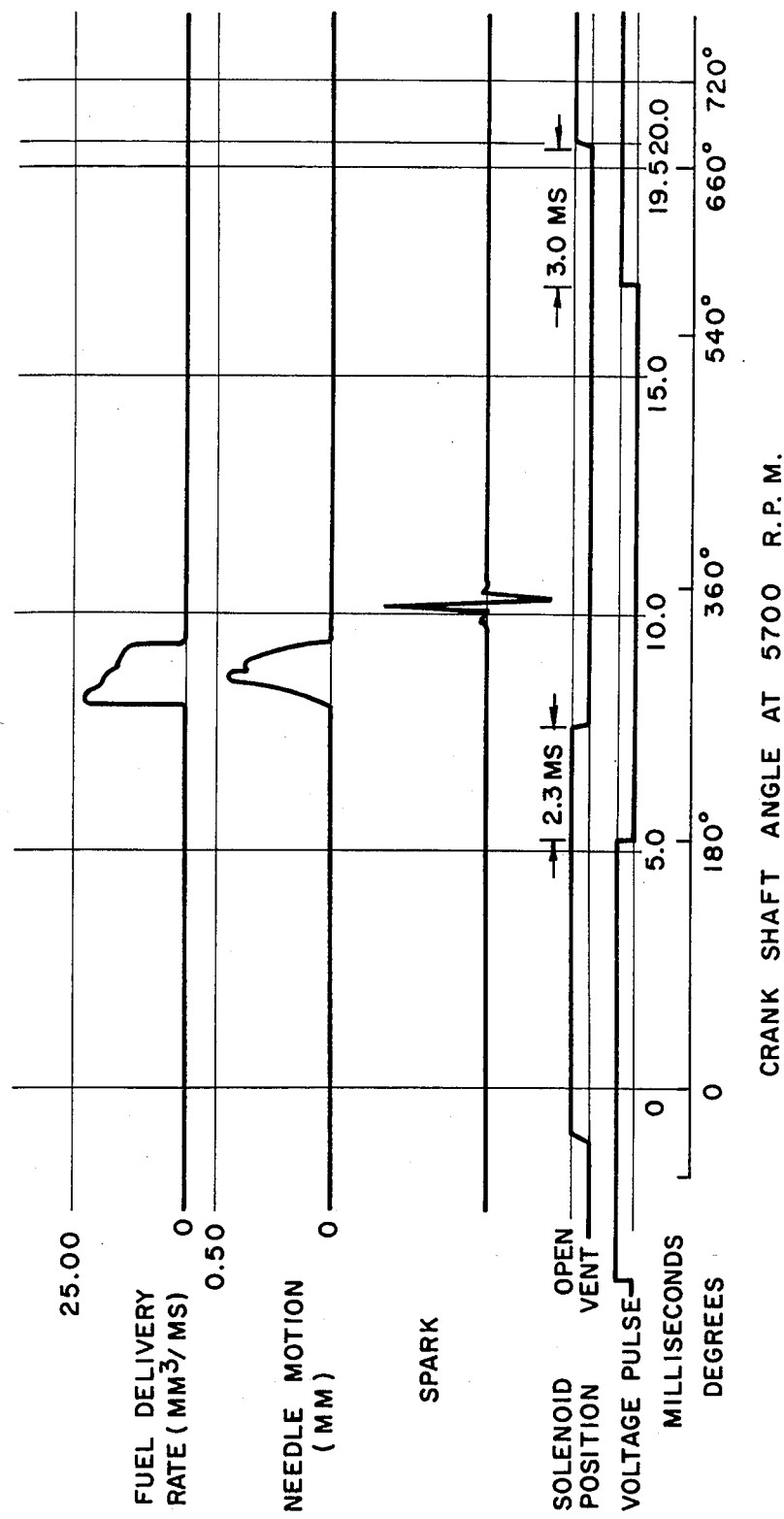
Figure 23:
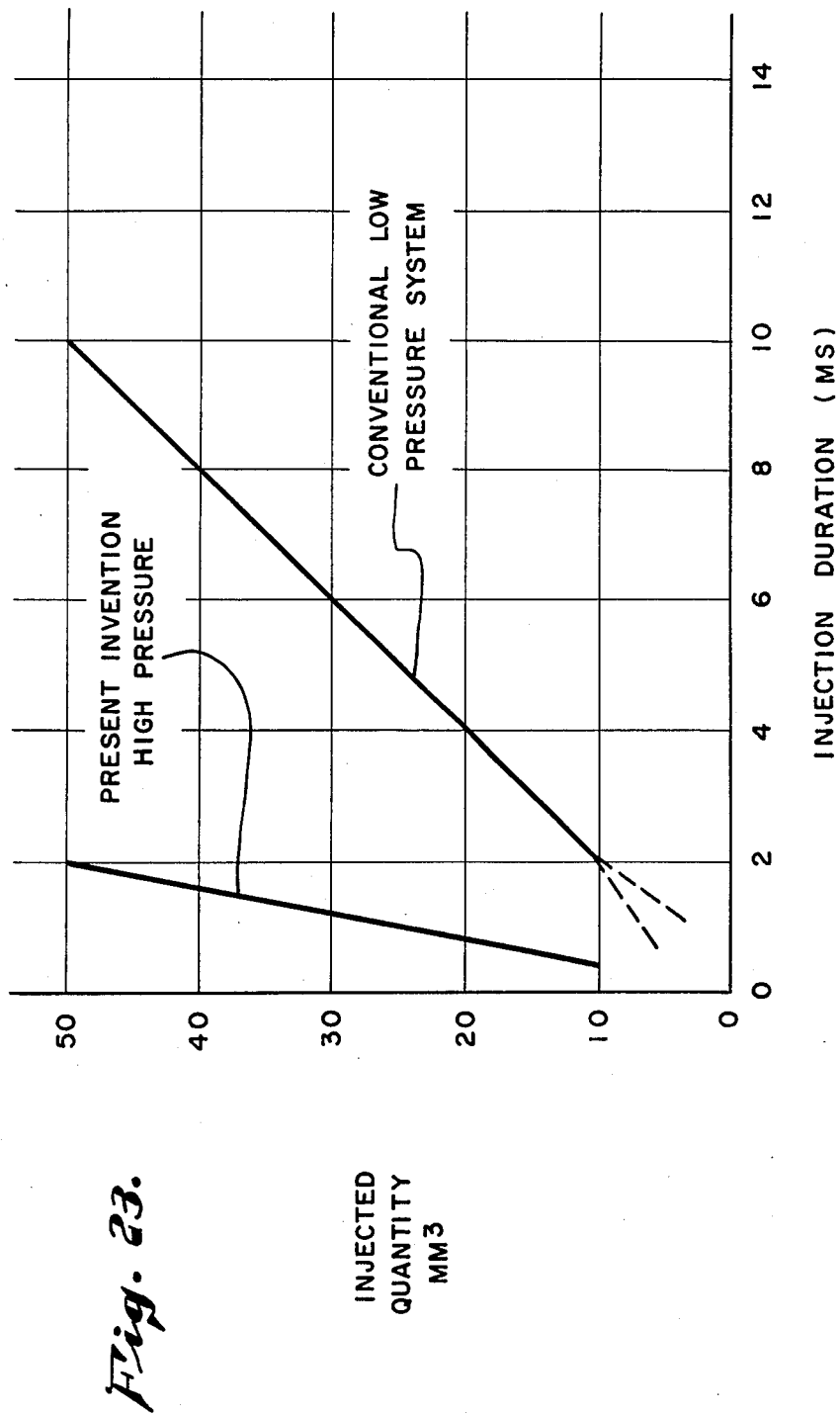

FIGS. 5 (a and b) and 6 are cross-sectional elevational views of the unit injector assembly of FIG. 3 taken on the respective cross-section lines indicated in FIG. 4;

FIG. 7 is an enlarged fragmentary cross-sectional view showing the T valve in its closed position;

FIG. 8 is an enlarged fragmentary cross-sectional view of the spray tip;

FIG. 9 is an enlarged fragmentary portion of FIG. 5a, but showing the intensifier pistons during their forward stroke and the T valve in its open position;

FIG. 10 is a partial view like FIG. 9, but showing the alternate position of the solenoid valve;

FIG. 11 shows the electrical pulse applied to the solenoid valve;

FIG. 12 is a wave form diagram illustrating the operating cycle of the unit injector assembly of FIGS. 2 through 10;

FIG. 13 is an enlarged view of one portion of the wave form diagram of FIG. 12;

FIG. 14 is a schematic diagram of a unit injector system having two control valves operating in cascade;

FIGS. 15a and 15b are a cross-sectional view of the unit injector system of FIG. 14, showing an alternate valve position in dotted lines;

FIG. 16 is a schematic diagram of a pressure-controlled injector which does not utilize pressure intensification;

FIGS. 17 and 18 are elevation and cross-section views, respectively, of an injector in accordance with FIG. 16;

FIG. 19 shows a wave form diagram during operation of the injector of FIG. 17;

FIG. 20 is an enlarged view of one portion of the wave form diagram of FIG. 19;

FIG. 21 is a timing diagram for the injector of FIG. 17 when used in a spark ignition engine, where the spark timing corresponds to manifold injection;

FIG. 22 is a timing diagram like FIG. 20 but showing the spark timing for in-cylinder injection; and FIG. 23 shows a comparison of injection characteristics for gasoline engines.

V. SYSTEM ARRANGEMENT (FIGS. 1 AND 2)

Figure 1:
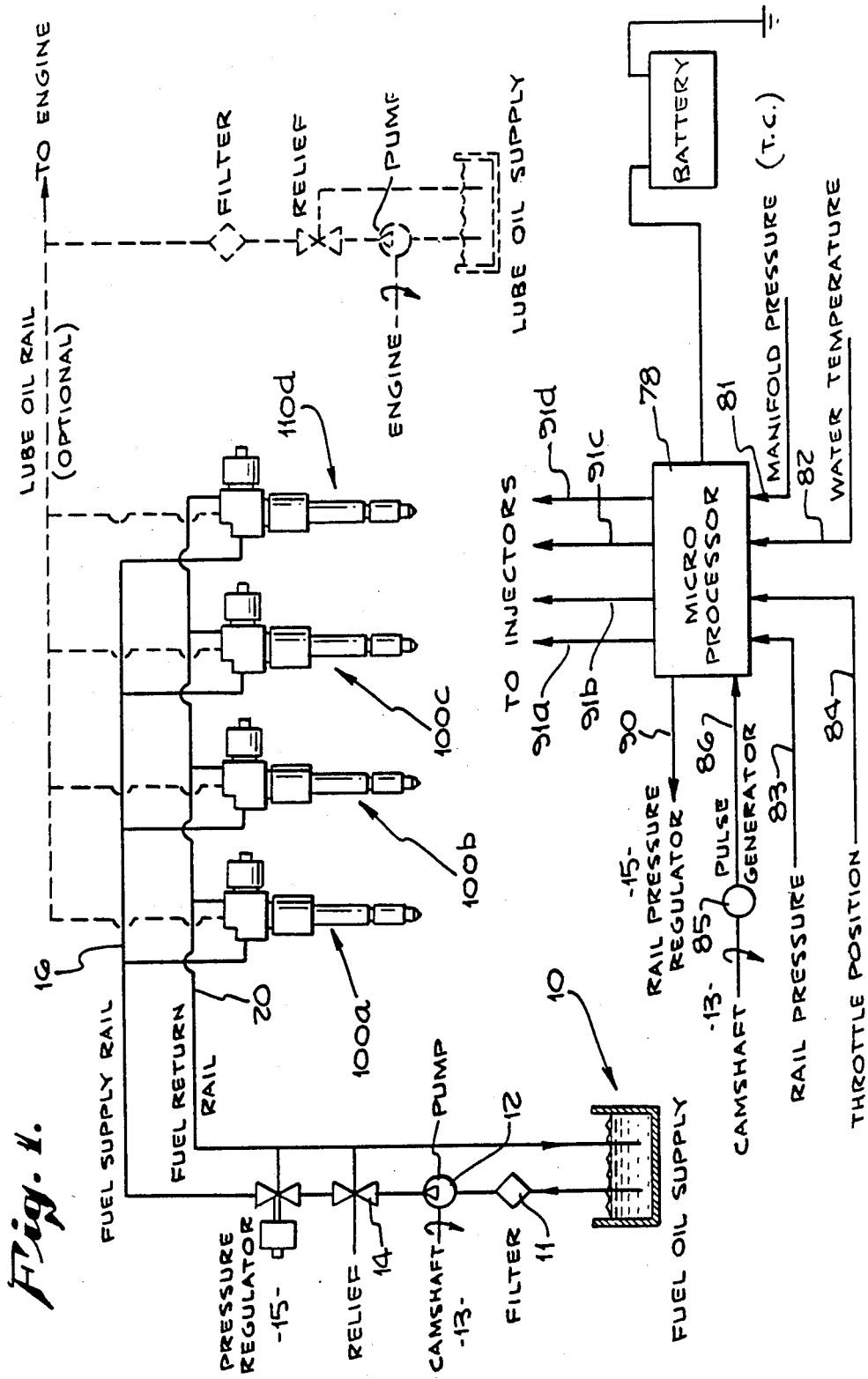
FIG. 1 is a schematic drawing of a fuel injection system for a four-cylinder engine in accordance with the present invention.

Referring now to FIG. 1, a complete fuel supply system for a four cylinder diesel engine is there illustrated in schematic form.

From a fuel supply tank 10, liquid fuel is drawn through a filter 11 by means of a pump 12 driven mechanically from the engine cam shaft 13 (not shown). Pump 12 is of the continuous flow type, generating a relatively continuous but adjustable pressure. From pump 12 the fuel flows through a relief valve 14 to a pressure regulator 15. From regulator 15 the liquid fuel is supplied at a steady pressure to a fuel supply line 16, which is connected to all of the unit injector assemblies.

Four substantially identical unit injectors assemblies 100 are shown in accordance with their actual physical appearance. It will be understood that each unit injector assembly is mounted on the engine cylinder head for purpose of injecting fuel charges into the combustion chamber of the respectively associated cylinder of the engine.

Also shown in FIG. 1 is a fuel return line 20. It serves as a drain from each of the unit injector assemblies 100.

Figure 2:
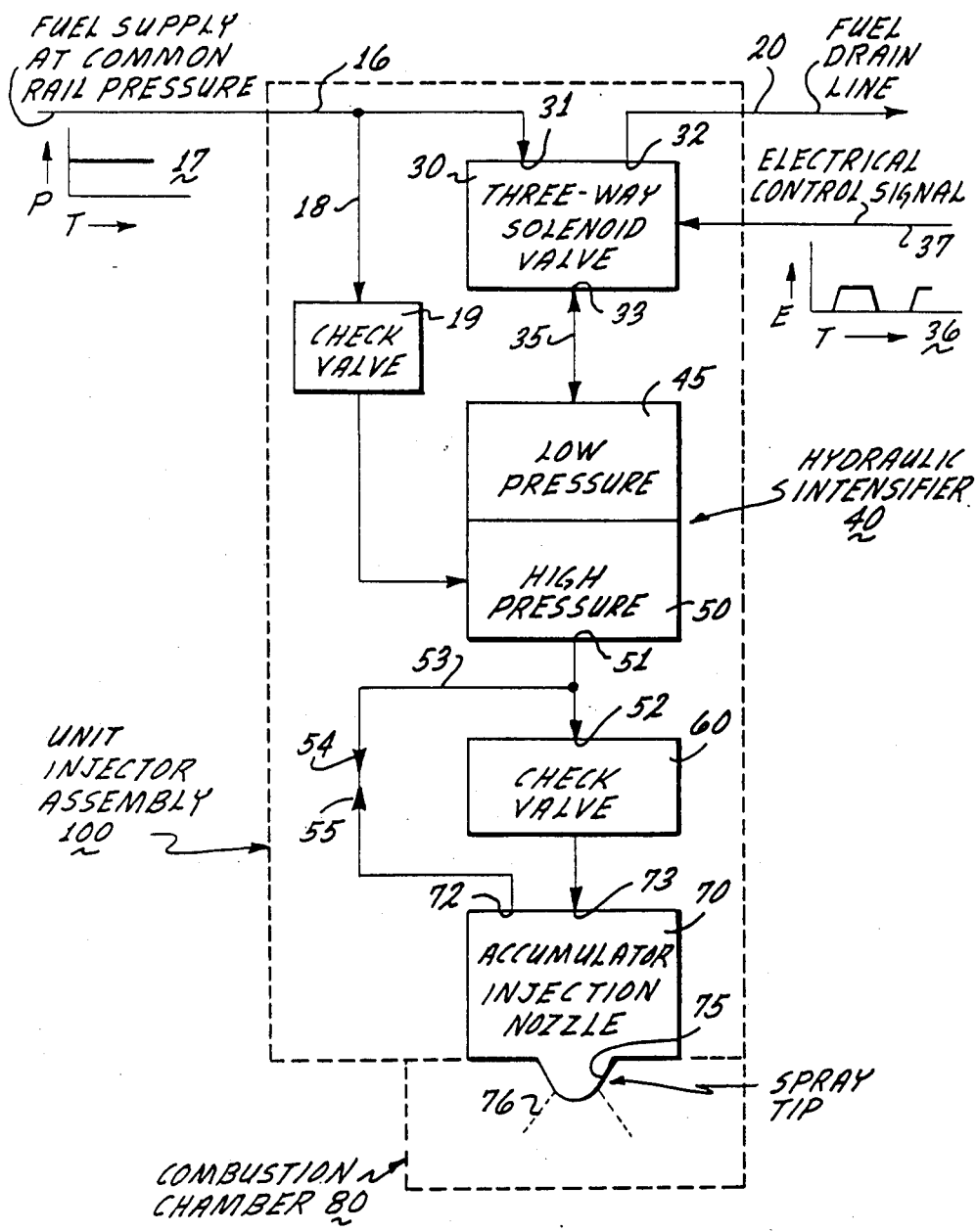
FIG. 2 is a schematic diagram illustrating the primary functional features of one of the unit injector assemblies.

Reference is now made to FIG. 2 which schematically illustrates the structure and operation of one version of an individual unit injector assembly 100. It should be noted that reference numerals smaller than 100 are used to identify the various features of the complete fuel injection system as shown in FIG. 1. They are also used to identify the schematically represented parts of the unit injector assembly as shown in FIG. 2. In the later drawing figures, where the actual mechanical construction of a unit injector assembly 100 is shown, the various parts are identified by reference numbers greater than 100.

As schematically shown in FIG. 2, the unit injector assembly 100 receives its fuel supply at a pressure from the common supply line 16. Fuel drain line 20 leads from injector assembly 100. The operation of the unit injector assembly is controlled by a three way solenoid valve 30. The operation of the valve, in turn, is controlled by a voltage pulse 36 received on the electrical control signal line 37. The unit injector assembly is mounted on the engine cylinder head, not shown. The function of the unit injector assembly is to inject fuel into a combustion chamber 80, shown in dotted lines, of an associated engine cylinder.

More specifically, the common fuel supply has a steady, but adjustable, pressure level as shown by the small diagram 17. The electrical control signal for the solenoid valve consists of a series of voltage pulses as shown in the diagram 36. One voltage pulse is supplied during each cycle of the engine operation, as will later be explained in more detail.

The solenoid valve 30 has an inlet port 31 which receives fuel from the common rail supply line 16. It also has a common outlet port 33. It also has a drain port 32 to which the fuel return line 20 is coupled. Application of the leading edge of voltage pulse 36 acts to move the valve to the "on" condition so that there is fluid communication between inlet port 31 and the common outlet port 13. At the same time, there is no fluid communication with drain 32. Then when the voltage pulse ends, the valve is returned to its "off" position, in which fluid communication is between the common outlet port 33 and the drain port 32 and not with the fuel inlet port 31. It will be understood that solenoid-controlled three way valves operating in this general fashion are previously known in the art. However, the use of ball or poppet valves which are very low in friction and wear are pertinent to the design of this unit injector. Spool valves would be high in friction and wear and would be sensitive to dirt and viscosity.

Hydraulic intensifier 40 includes a low pressure chamber 45 and a high pressure chamber 50. The high pressure chamber 50 is also known as the compression or intensifying chamber. A metering duct 18 connects directly from the fuel supply line 16 through a check valve 19 to the compression chamber 50, so that a supply of fuel is always available to the compression chamber.

In the schematic diagram of FIG. 2 a line 35 connected between common outlet port 33 of the solenoid valve and low pressure chamber 45 has arrows pointing in both directions. This line and its arrows schematically illustrate the operation by which fuel is alternately supplied from the valve into the low pressure chamber during one portion of each engine cycle, and then subsequently flows from that chamber back into the valve. More specifically, when the valve has been turned on by the voltage pulse 36 fuel flows from supply line 16 through inlet port 31 and hence through the interior of valve 30, its common outlet port 33, and into the low pressure chamber 45 of the intensifier. When the voltage pulse ends and the solenoid valve is turned off, the fuel in the low pressure chamber 45 then flows in the reverse direction to the common outlet port 33 of the valve, hence through the interior of the valve to drain port 32, and thence to the fuel drain or return line 20.

The low pressure chamber 45 of hydraulic intensifier 40 does not contain the fuel charge that is ultimately injected into the combustion chamber 80. Its only function is to multiply the pressure of the fuel within the compression or intensifying chamber 50. (Chamber 150 of FIG. 5a). The term multiply used in the sense of this invention is the ratio of the areas of the low and high pressure intensifier pistons. Thus, once during each engine cycle a quantity of fuel passes through the solenoid valve into the low pressure chamber 45, and the energy created by the flow of heat quantity of fuel is then utilized to multiply the pressure of the fuel contained in high pressure chamber 50. When the potential energy stored in the accumulator has been converted to injection energy that quantity of fuel which had previously entered said chamber 45 is caused to drain off to the fuel return line 20. This operation is repeated during each cycle of the engine operation. The use of a hydraulic intensifier in a diesel fuel injection system is shown in the Luscomb U.S. Pat. No. 4,219,154.

Accumulator injection nozzle 70 is shown as having two separate fuel inputs designated as 72 and 73. The fuel admitted into input 73 comes from compression chamber 50 via outlet port 51 and check valve 60 with its inlet port 52. Inlet 72 receives its fuel supply through circuit 53 which bypasses check valve 60. The quantity of fuel passing through this circuit is extremely small because of the very close fit between the check valve (T-valve 180 in FIG. 5a) and the needle valve stem (190 in FIG. 5a). On the schematic FIG. 2, the opposing arrows 54 and 55 on circuit 53 show that while two-directional flow is possible, the function of this circuit 53 is more one of pressure communication. (i.e., pressure applied to or developed by the upper end face 194 of needle valve 190, FIG. 9).

During each cycle as the pressure in the compression chamber 50 is building up, the check valve 60 becomes biased in a forward direction and permits fuel to pass from the high pressure chamber 50 into the accumulator injector 70. By this means a fuel charge is admitted to the accumulator injector during each said cycle. When electrical pulse 36 ends, solenoid valve 30 closes, the pressure in low pressure chamber 45 drops, and the pressure in the high pressure chamber 50 also decreases rapidly. This causes check valve 60 to close, stopping the flow of fuel through that check valve into the accumulator. However, a fuel pressure coupling of limited effect still exists between the metering chamber 50 and the accumulator injector nozzle 70 by way of the pathway schematically illustrated by the line 53.

Discontinuance of the inflow of the fuel charge into accumulator injector 70 and the subsequent decrease in pressure in line 53 initiate injection of the fuel charge into the combustion chamber. The fuel enters chamber 80 as sprays 76 whose directions are determined by the orifices of spray tip 75.

The structure of the accumulator injector 70, and its mode of operation, including check valve 60 and the parallel pressure path 53, are generally similar to that shown in the Falberg U.S. Pat. No. 2,985,378. However, as will be seen in connection with the description of the presently preferred embodiment of the invention, the accumulator injector of the invention does provide certain novel features which result in improved operation.

It will be understood that a hydraulic mechanism such as schematically illustrated in FIG. 2 requires an initial priming with the supply liquid before it achieves a steady operating state. In the preceding description it has been assumed that the initial priming or start-up condition has already occurred, and that the device is operating in a steady state fashion.

By way of example, a typical pressure in the supply line 16 may be on the order of 1,500 psi (pounds per square inch). The multiplying effect of intensifier 40 may be fifteen or more, or as low as three. Therefore, the pressure in metering chamber 50 may be raised to about 22,500 psi (1,500×15=22,500), and this full pressure is transferred into the accumulator injection nozzle 70.

Reference is again made to FIG. 1 showing the complete fuel supply system. An electrical control system such as a microprocessor 7 is used to control the operation of the fuel supply system. The microprocessor receives various input signals, and produces various output signals, as will now be described.

An input signal representing intake manifold air pressure of the engine is shown as being received on an input line 81. Another input signal representing cylinder block water temperature is shown as being received on an input line 82. Another input line 83 is shown supplying an electrical signal whose magnitude is shown representing the pressure level in the fuel supply line 16. Still another signal applied on input line 84 represents the position of the throttle where throttle in this case means a demand as established by the operator of the engine, or as established by some external source to meet desired load conditions. Since the fuel injections must be synchronized with the engine, an electrical signal is acquired, for example, from cam shaft 13 for the purpose of timing or synchronizing a pulse generator 85 with the engine. On a two-stroke cycle engine, engine position information may alternatively be obtained from the crankshaft. Signals from the pulse generator 85 are supplied on an input line 86 to the system.

According to the present invention the microprocessor 78 carries out a timing cycle within which a series of events are timed and controlled, and the duration of that timing cycle may correspond to one revolution of the engine crankshaft, or to two or more crankshaft revolutions. In the case of a two-stroke cycle engine the timing cycle will ordinarily be carried out during one complete revolution of the engine crankshaft. For a four-stroke cycle engine, the timing cycle would ordinarily correspond to two revolutions of the engine crankshaft.

In accordance with the present invention, however, the fuel consumption may be reduced considerably for certain engine operating conditions by changing the timing. For example, a two-stroke cycle engine that is idling and not under load, might have the timing cycle as determined by the microprocessor set to initiate an injection of fuel not at every revolution, but rather at every two, three or four engine revolutions. In similar fashion, for a four-stroke cycle engine, the timing cycle of the microprocessor may be modified to correspond to an integral multiple of two engine revolutions. The operating cycle of the engine then corresponds to the timing cycle set by the microprocessor.

Engine position information may be obtained from the camshaft alone. Or, alternatively, engine position may be obtained from the crankshaft in addition to the camshaft, in order to improve resolution.

In general, the sequence of electronic timing signals may be altered so that individual injection and ignition cycles are selectively eliminated from the normal sequence of events to improve efficiency, and to control power, speed, torque impulses, exhaust emissions and other engine characteristics.

An output line 90 generates an electrical signal which is utilized for controlling the operation of pressure regulator 15. Adjusting the pressure setting of regulator 15 in turn causes the pressure on supply line 16 to either increase or decrease, and results in a corresponding change in the quantity of the fuel charge injected into the combustion chamber of each cylinder. The manner in which this pressure regulator control function is carried out, and its significance, are described later in greater detail.

The microprocessor 78 also has signal output lines 91a, 91b, 91c, and 91d. The output signal supplied from output line 91a controls the operation of unit injector assembly 100a, while output lines 91b, c and d control the injector assemblies 100b, c and d, respectively. Each output signal on one of the lines 91 consists of a voltage pulse (pulse 36 of FIG. 2) which occurs once during each timing cycle of the microprocessor 78. When the pulse commences, the coil of solenoid valve 30 (FIG. 2) of the associated injector assembly is energized. When the pulse of voltage (36) ends, the solenoid coil is de-energized.

The signals supplied to the output lines 91 provide four important timing functions for controlling the operation of the unit injector assemblies 100, and hence the operation of the diesel engine as a whole. These different timing functions will now be briefly identified.

One timing function, alredy mentioned, is to reduce the engine fuel consumption by making the timing cycle of the microprocessor, and hence the engine cycle, correspond to an integral multiple of the normal engine firing cycle.

A second important timing function of the micro processor output signals is to establish the instant of time at which fuel injection into the combustion chamber will commence relative to the top dead center position of the associated piston. This particular timing function is controlled by the point at which the pulse of voltage ends, thus de-energizing the associated solenoid valve. This function is described in more detail later.

A third timing function of the microprocessor is to determine the duration of the time interval throughout which the solenoid valve is energized. The duration of that time interval may be increased by turning on the valve earlier, or may be decreased by turning it off earlier. This particular timing function affects the amount of pressure intensification that is attained by pressure intensifier 40 (FIG. 2), and hence the quantity of each injected fuel charge, as will be described in greater detail later.

There is a fourth timing function which the microprocessor 78 may be called upon to perform. This timing function is to make individual adjustments for each cylinder of the engine in respect to the time when injection is to be commenced, and also in respect to the duration of the time interval through which the solenoid valve is turned on. This is a "fine tuning" function which is discussed in more detail is one of the last paragraphs of this description.

VI. DETAILED DESCRIPTION OF THE MECHANICAL PARTS OF THE UNIT INJECTOR ASSEMBLY

This description is made with reference to drawing FIGS. 3 through 10 inclusive, and includes numbered paragraphs.

PARAGRAPH 1

The solenoid unit 30, FIG. 3, is separately pacakaged. It is described in copending patent application Ser. No. 411,298 filed on Aug. 25, 1982, and U.S. Pat. No. 4,391,292, both of which are under the same ownership as the present application. The solenoid unit is concentric about a central longitudinal axis, with certain exceptions. One exception is the lead wires 37 which connect at one part of the circumference of the energizing coil. Another exception is two transverse passageways 38, 39 (FIGS. 5a and 9) associated with respective ball valves 31a, 32a. As shown in these drawings they are aligned vertically, but that alignment is not required.

PARAGRAPH 2

The next part of the structure is the block or base member 110 for the control module. It is shown in FIGS. 3, 4, 5a, 6 and 9. As shown in FIG. 5a the top opening 32 is the drain port. The opening at the left is the fuel supply port 31. There is also an opening on the righthand side where the solenoid unit 30 is inserted, with mating threads, and the solenoid is simply screwed in secured to hold it in place. Three O-rings aid the sealing of the solenoid in the block. A shoulder on solenoid valve body 35 bears against a should 110a to locate the solenoid valve in the block 110. The fuel inlet opening 31 is concentric with the cavity in block 110 which receives the solenoid unit 30. Therefore, the incoming fuel flows directly against the end of the solenoid unit. Below the solenoid valve cavity there are three passages extending vertically downward. The opening at the extreme left as shown in FIG. 5a is the metering duct 118. The opening in the middle is the common outlet port 33 coupled to the low pressure chamber of the hydraulic intensifier. The opening on the righthand side is a drain off line or passageway 120 for ensuring proper operation of the intensifier, as will be described later. Also formed in the block 110 are an annular opening 122 providing communication between transverse passage 38 and outlet passage 33, and annular opening 124 providing communication between transverse passage 39 and drain off line 120.

PARAGRAPH 3

In drain off line 120 there is a check valve 121, the detailed structure being like that of check valve 119 as shown in FIG. 9. This structure includes a spring and a holding cap, the holding cap being retained by a press fit into an opening in block 110.

PARAGRAPH 4

FIG. 6 shows a sectional view of the block or base member 110 for the control module, but at a 90 degree angle from FIG. 5. Complete lubrication circuit for the control module as seen in FIG. 6 includes a lubrication port 125 at the top, a check valve 127 beneath the lubrication port, and a pair of ducts 128, 129 which lead to a large piston 130 and a small piston 140, respectively, of the intensifier. The lubricant circuit which is shown completely only in FIG. 6 is an optional feature of the apparatus. Its function, in addition to reducing friction in the case of some fuels also serves to block leakage of fuel oil past the pistons 130 and 140.

PARAGRAPH 5

The large and small pistons 130 and 140 of the hydraulic intensifier are shown in FIGS. 5a, 6, 7, 9 and 10. The large piston 130 is hollow, in the form of an inverted cup and moves axially in a cylindrical bore formed in a chamber 145. The small piston or rod 140 moves axially in its own bore. To avoid problems of concentricity and alignment, the two piston members are not fastened, but do remain in contact at substantially all times. The base member of block 110 contains the large bore 145 for the large piston 130 of the intensifier, and also an annular groove 128a spaced along the bore 145 which carries lubricating oil as previously mentioned.

PARAGRAPH 6

A smaller block 111 is positioned immediately beneath and firmly abutting the big block 110 of the control module. See FIGS. 5a, 6, 7 and 9. The axial bore 112 in which the rod or small piston reciprocates also contains its annular lubricating groove 129a as seen in the various Figures. Also contained in the block 111 as shown in FIG. 5a are metering duct 118a and check valve 119. Duct 118a is aligned to communicate the duct 118 in block 110 with a chamber 150 below piston 140.

PARAGRAPH 7

The structural details of check valve 119 in the metering duct are shown in FIG. 9.

PARAGRAPH 8

The chamber 150 beneath piston 140 adjacent to the accumulator chamber 150a constitutes a compression or intensifying chamber. See FIG. 5a. A washer 151 is located at the bottom end of the compression chamber. There is a recess in block 111 concentric with the compression chamber but of wider diameter, and the washer fits in that recess. The washer has a central hole which is of somewhat lesser diameter than the compression chamber. The metering duct 118a converges into the compression chamber 150 immediately adjacent the washer.

PARAGRAPH 9

A dowel pin 155 clearly shown only in FIG. 5a positively aligns the two blocks 110, 111 of the control module so that the two ports 118, 118a of the metering duct are in full communication with each other. The same dowel pin 155 is of a length to also extend below the block 111 a short distance into the upper end of the main body of the accumulator 160. This dowel pin, in conjunction with another dowel pin to be described later, is necessary to establish the correct rotational position of the spray orifices relative to the longitudinal axis of the accumulator injector assembly.

PARAGRAPH 10

The parts which have now been briefly described are all of the component parts of the control module. A hex nut 157 which holds the two blocks 110 and 11 together is described below.

PARAGRAPH 11

Contained within a cylindrical bore at the upper end of the accumulator body 160 is a spring separator 170. The diameter of the bore holding this spring separator 170 is sized to tightly receive it and the end of the bore has a flat shoulder to permit the piece 170 to maintain an annular sealing contact. The length of this separator piece 170 is such that when inserted in its accumulator body cavity it is flush with the end surface of the body 160. Thus when the nut 157 clamps body 160 against the block 111 the spring separator 170 is rigidly fixed within the body 160 bearing as if it were an integral part of the accumulator body itself. The spring separator is optional as is spring 200. Spring 210 may be increased in length so as to bear upon T-valve 180 and thereby provide a closing load to both the needle valve 190 and the T-valve.

PARAGRAPH 12

A T-valve 180, smaller, but similar in shape to the spring separator 170 is shown in FIGS. 5a, 7 and 9 loosely inserted within the separator piece 170 in an inverted position relative to piece 170. A radical clearance between the two pieces 170 and 180 of approximately 0.010 inches permits a downward flow of fuel around this T-valve. The top or end wall of this valve piece 180 has a central opening 185 to receive the upper end of a needle valve member 190. The diameter of this opening 185 is approximately 0.122 inches. Relative sliding occurs between the needle 190 and the T-valve 180, but the clearance between the two parts is kept to a minimum. On the upper surface of the T-valve, i.e., the bottom of the cup, there is a recess 187 which is clearly shown in FIG. 5a, 7 and 9.

PARAGRAPH 13

It is important that the central hole 152 through the washer 151 be of smaller diameter than the upper end of the needle valve member 190 within the accumulator chamber 150a because the washer 151 acts as a stop or bumper for the member 190. It could not perform that function if the central opening were big enough to allow the needle valve to enter. Another size relationship is that of the depth of the recess 187 on the upper surface of the needle valve and the thickness of the washer 151. The recess depth must be less than the washer thickness to prevent the washer from becoming displaced from its recess due to the greater diameter of the recess 187 than the diameter of the washer 151. The reason for the large diameter of the recess 187 is that a relatively narrow lip is desired on the upper circumferential surface of the T-valve. The narrow lip 182 (FIG. 7) ensures a high unit pressure when the T-valve is closed, and provides an effective seal with the bottom face of block 111. In the present embodiment the diameter of the entire T-valve is about 0.385 inches, while the radial thickness of the sealing lip is about 0.021 inches.

PARAGRAPH 14

A small spring 200 in accumulator chamber 150a shown in FIGS. 5a, 7 and 9 works in conjunction with the T-valve as part of the same mechanism. This is a relatively light spring exerting a small force. Its lower end seats on the spring separator 170 while its upper end seats on the under surface of the horizontal wall of the T-valve member 180.

PARAGRAPH 15

Reference is now made to the needle valve member 190 as shown in FIGS. 5a, 5b, 7, 8 and 9. An accumulator tip 165 provides an extension of the lower end of accumulator body 160. Needle valve member 190 is an integral member extending almost the full length of the accumulator. A hemispherical surface 192 on the lower end of valve member 190 engages a hemispherical valve seat 166, as shown in FIG. 8. The radius of the valve face 192 of the valve member 190 is kept slightly less than the radious of the valve seat 166 (or the order of 1% less). The needle valve member 190 is a rod of generally uniform diameter throught its length, except for its lower end where the valve face 192 is formed, and an annular flange 195 (FIG. 5a) located near its upper end. It is essential, however, that the diameter of the needle valve member at the valve seat 166 is smaller than the diameter above the flange 195. See FIG. 5a. This is necessary to create a net pressure loading on needle valve 190 for lifting the needle valve 190 off its seat when fuel injection is to commence. The length of the needle valve member relative to the accumulator body is also critical. That is, as shown in FIGS. 5a and 5b, when the valve member 190 is seated on its valve seat 166 at the lower extremity of the accumulator body, the upper end 194 of the needle valve member is spaced a short distance beneath the previously described washer 151. This distance is about 0.016 inches, in the presently preferred embodiment.

PARAGRAPH 16

Reference is now made to the bottom washer 205 seen only in FIG. 5a. The accumulator body 160 has a change in the diameter of its internal opening at a point immediately below where the annular flange 195 of the needle valve member 190 is positioned. That change in diameter creates an annular shoulder 161 within the accumulator body. The washer 205 rests on the annular flange 195 of the needle valve member. There is substantial clearance between the accumulator body 160 and the annular flange 195 of the valve member 190. A clearance is also maintained between the washer 205 and the accumulator body. This clearance is necessary in order to allow a downward flow of liquid fuel at all points around the circumference of the needle valve member, and of the washer.

PARAGRAPH 17

A large spring 210 shown in FIGS. 5a, 7 and 9 extends between the lower washer 205 and the spring separator 170. It normally holds the needle valve member against its seat. The larger spring 210 has a much higher spring force than the small spring 200 associated with the T-valve. Spring 200 is small to reduce the pressure drop across the T-valve.

PARAGRAPH 18

The accumulator tip 165 of FIGS. 3 and 5b, is shown in an enlarged form in FIG. 8 with its valve seat 166 and representative passages 177 acting as nozzle orifices for the fuel sprays 176.

PARAGRAPH 19

A lower dowel pin 167 is shown only in FIG. 5b. It holds the tip 165 of the accumulator onto the accumulator body 160 in a predetermined rotational position, so that a correct alignment of the spray orifices is established.

PARAGRAPH 20

A lower hex nut 168 is shown in FIG. 3, and in cross-section in FIG. 5b. It works in a fashion similar to the upper and larger hex nut 157, but holds only two body members together rather than three.

The injector module is designed to be manufactured as a separate unit from the control module.

VII. OPERATION OF THE SOLENOID VALVE (FIGS. 5a, 9 and 10)

Referring to FIG. 5a, the solenoid valve 30 has a coil winding 34 which receives one of the voltage pulses 36 during each cycle of the engine operation. Energizing the coil 34 causes a solenoid plunger 34a to move a short distance to the left. The position of the plunger as shown in FIG. 5a is its extreme righthand or outer position, and that is considered to be the closed position of the three-way valve.

With the plunger in the position shown in FIG. 5a, liquid fuel which enters the port 31 cannot enter the interior of the solenoid valve, because it is stopped by a ball 31a which is seated on its valve seat. The supply pressure received at the inlet port 31 ensures that ball 31a will remain seated against its valve seat. Thus, there is no fluid communication between inlet port 31 and either the drain port 32 or the common outlet port 33.

Concurrently, the seated ball 31a through a plunger extension 34b holds ball 32a in its open position and away from its corresponding valve seat. Therefore, liquid fuel which may be present in the common outlet port 33 is free to flow through the annular space 122 of block 110, into transverse passageway 38 of the solenoid valve, longitudinally in the central core of the valve body, and around the ball 32a. From that point on the fluid will flow into the transverse passageway 39 of the valve, then the annular space 124 in block 110 and hence to the fluid drain port 32. The fingers at points around the circumference of ball 32a limit the movement of ball 32a as shown in FIG. 5a. Hence, there are spaces between these fingers which permit the fluid to flow between transverse passage 38 and transverse passage 39 of the valve.

The open position with the solenoid valve energized is shown in FIG. 9. Fuel entering port 31 now flows around the ball 31a into the transverse passageway 38, and through annular space 122 into common outlet port 33. At the same time, ball 32a is firmly seated on its respective valve seat, thus interrupting fluid communication between the common outlet port 33 and the drain port 32.

VIII. OPERATION OF THE HYDRAULIC INTENSIFIER

(FIGS. 5a, 9 and 13)

In general, liquid fuel from the common supply line 16 is admitted by the solenoid valve 30 into the common outlet port 33 during a portion of each engine cycle. It then flows into low pressure chamber 145, as best seen in FIG. 9. The filling of low pressure chamber 145 causes the large or low-pressure piston 130 to move downward. This motion in turn forces the rod or high-pressure piston 140 to move downward, and reduce the volume of the compression chamber 150 (FIG. 5a) under the piston 140. This reduction in volume causes a pressure rise which in turn causes the fuel to flow through the check valve and into the accumulator.

When the voltage pulse 36 ends, and the solenoid valve returns to its closed position as shown in FIG. 5a, the operation is as follows. The closing of the solenoid valve has opened the passageway between common outlet port 33 and drain port 32, causing the fuel in low pressure chamber 145 to be drained into the fuel return line. This dropping of the pressure in the low pressure cavity causes a very rapid drop in pressure in the high pressure chamber down to the common rail pressure. Liquid fuel at the common rail pressure flows from supply line 16 through metering duct 118 and past the check valve 119 into compression chamber 150. This pressure applies a force to the rod or cylinder 140 causing it to move upward. Since the pressure in the fuel return line is at a zero or reference level, there is a net pressure differential of typically 400 to 1,500 psi (the common supply pressure) available to drive both of the pistons 130, 140 from their lowermost positions as shown in FIG. 9, back to their uppermost positions as shown in FIG. 5a.

It will be noted that the hollow interior of the large piston 130 provides a large internal space which will receive fuel (or lubricating oil if said circuit is used) due to leakage past the large piston 130 and small piston 140. A series of passageways 120 provide communication from this space or chamber through the lower edge of block 110, to annular space 124 of the block 110, and into the fuel drain line. Without this series of passageways, hydraulic locking of the pistons would occur. Check valve 121 shown in FIGS. 5a and 9 prevents liquid from flowing in the opposite direction, and maintains the effectiveness of the intensifier. Thus any accumulation of liquid inside the chamber is prevented through the cooperative action of the drain line 120, check valve 121, and annular space 124.

A further feature of the hydraulic intensifier in accordance with the present invention is the provision of lubricating grooves 128a and 129a. Groove 128a surrounds the large piston 130 while 129a surrounds the small piston 140. Lubricating oil or grease having a high viscosity is admitted into the port 125 as shown in FIG. 6 and thence through check valve 127 and ducts 128, 129 to the respective lubricating grooves. The purpose of this arrangement is not merely to provide lubrication for the reciprocating movements of the pistons of the hydraulic intensifier. An additional purpose, perhaps even more important, is to prevent or greatly reduce leakage of the diesel fuel past the lubricating grooves. The prevention or reduction of the fuel leakage is accomplished because the lubricating oil has a much higher viscosity than does the liquid fuel.

IX. OPERATION OF THE COMPRESSION CHAMBER

(FIGS. 5a, 7 and 9)

When the high pressure piston 140 is in its most elevated position as shown in FIG. 5a, the compression chamber 150 is then full of liquid fuel. As the piston 140 moves upward under pressure flows from the supply line 16 through the entry port 31 and metering duct 118 and past the check valve 119 into the compression chamber. When the high pressure piston starts to move downward, however, the ball valve 119 seats and seals, preventing any flow of the liquid fuel in the reverse direction out the metering duct 118. Thus a selected or predetermined quantity of fuel at the line pressure (about 500 to 1,500 psi) is trapped in the compression chamber 150.

During subsequent operation of the intensifier, the pressure of compression chamber 150 is greatly increased to a pressure equal to the pressure on the large piston times the area ratio of the large and small pistons. The volume of chamber 150 reduces as the pressure increases due to the compressibility and density of the fuel as fuel is displaced into the accumulator chamber 150a when the intensifier piston moves downward. As a typical value, the level of pressure of the fuel inside the compression chamber may be increased by a factor of fifteen.

Reference is now made to FIG. 13 illustrating the operation of the presently preferred embodiment of the invention. As shown in FIG. 13, at zero milliseconds or just before the solenoid 30 opens, the pressure in the compression or high pressure chamber 150 is about 1,500 psi. Opening of the solenoid valve 30 causes this pressure level to rise rapidly to about 6000 psi. The continuing operation of the intensifier, with additional liquid fuel flowing into the low pressure chamber 145, causes the pressure level in the compression chamber to rise to about 22,000 psi. This action takes place over a period of approximately 9 milliseconds. As shown in FIG. 13, the T-valve 180 opens when the pressure in the compression chamber reaches about 6000 psi, and the subsequent trransfer of fuel into the accumulator accounts for a reduced rate of pressure increase. The rise and rate of rise of pressure inside the compression chamber are a function of the compressibility of the fuel, and since the compressibility of the fuel is not precisely linear (i.e., a straight line), the pressure increase in the compression chamber is also not linear.

The downward movement of the intensifier piston 140 reduces the volume of its pressure chamber 150, and determines the mass, or quantity, of the fuel charge to be stored within the chamber 150a by establishing the pressure level of the fuel charge. This mass is determined by the volume of the accumulator chamber 150a, the pressure in this chamber, and the compressibility and density properties of the fuel itself.

The minimum volume of chamber 150 is a function of the equilibrium balance of forces acting on each end of the piston. FIG. 12 shows that the movement of the piston 140 is relatively gradual over the time interval that the solenoid valve 30 is energized. It can also be seen from FIG. 12 that very little piston movement occurs just prior to the point when the solenoid valve 30 is de-energized. A changing of the length of time the valve is energized, and/or the point of time at which it is de-energized, has only a secondary effect on the mass of the fuel in the chambers 150, 150a prior to injection. Thus adjusting the time interval when the solenoid is "on" serves as a valuable method to trim, or moderately adjust, the mass or quantity of the fuel charge while the point of time when it is turned "off" determines the time of injection.

X. OPERATION OF THE T-VALVE AND THE NEEDLE VALVE (FIGS. 5a, 7 and 9)

The movements of the T-valve 180 and the needle valve 190 are in a definite sequential relationship with each other. The initial position is as shown in FIGS. 5a and 7, where both valves are closed; that is, the T-valve is in its uppermost position so that its lip 182 is in sealing relationship with the lower face of block 111. At the same time the needle valve member 190 is in its lowermost position so that its valve face 192 is seated upon the valve seat 166, as shown in FIG. 8.

The first of the sequential actions to take place is that the hydraulic intensifier causes the pressure of fuel in the compression chamber 150 to rise rapidly as previously mentioned and, as shown by the curve in FIG. 13. The T-valve opens when the pressure in compression chamber 150 exceeds the pressure in the accumulator chamber 150a by an amount which is due to both the spring load on the T-valve and the geometry of the sealing lip 182. This is approximately the closing pressure (about 6,000 psi) of the member 190. As previously mentioned, it is here assumed that the fuel system has already been primed, and that the description is of the continuing operation of the system on a steady state basis. The second sequential position of the two valves is that of the T-valve being open, while the needle valve remains closed as shown in FIG. 9. As indicated by the arrows in FIG. 9, liquid fuel then flows downward around the circumferential edges of the T-valve member 180, and into the central bore of the accumulator body or housing.

The next action to take place is the closing of the T-valve, returning both valve members 180 and 190 to their initial positions as shown in FIGS. 5a, 5b, 7 and 8. This action is caused by the turning off of the solenoid valve 30, with the resultant pressure drop in the low pressure chamber 145 and in turn in the high pressure chamber 150.

Although the valve positions are the same as previously, the conditions inside the accumulator chamber 150a are now significantly different. That is, the interior of the accumulator body or housing has been charged with an additional quantity of liquid fuel, raising its internal pressure from about 6,000 psi to about 22,000 psi. As a result, differential pressure acting inside the accumulator will cause the needle valve member 190 to be raised off the valve seat 166. Although this action is well known in the prior art, it will be briefly summarized here as well.

The diameter of needle valve 190 beneath the flange 195 is smaller than its diameter above that flange. Internal fluid pressure acting on differential areas as previously described creates a net force upward on the needle valve member. That force must be sufficient to overcome the force of large spring 210. It must, in addition, be sufficient to overcome the force of fluid pressure acting upon the upper end surface 194 of the needle valve member. In this connection, reference is made to the bucking arrows 54 and 55 in FIG. 2 which schematically illustrate the pressure changes taking place at the top end of the needle valve member (schematically check valve 60 of FIG. 2). The differential pressure is sufficient to raise the needle valve off its seat, hence upward movement of the needle valve member occurs, and fuel injection commences through the holes 177 in spray tip 175.

The fuel injection occurs during a time interval of about one to one and a half milliseconds. Internal pressure inside the accumulator chamber 150a quickly falls to the closing pressure for which it was designed, approximately 6,000 psi, depending upon the force of the spring 210 and other design factors. The needle valve member 190 then returns to its closed position. The spherical sealing surface 192 on member 190 reengages spherical seat 166, the seating stress being minimized by the previously described dimensional relationship between surfaces 192 and 166. Both valve members are again in their initial position as shown in FIGS. 5a and 7.

More specifically, the opening action of the T-valve is as follows: The pressure in compression chamber 150 is applied to recess 187, i.e., the entire cross-sectional area of the T-valve member 180 less the areas of bore diameter 185 containing the needle valve member 190, and circumferential lip 182. The pressure in the accumulator chamber 150a reaches a larger area, that of the member 180 less bore 185. Hence the pressure in compression chamber 150 is initially applied to a smaller area, and must also overcome the force of spring 200. After the valve opens, only the spring force need be overcome.

The action of the needle valve is self-centering because of its particular construction. That is, the upper end of the needle valve fits loosely in the opening in the spring separator 170. Similarly, the T-valve member 180 also fits loosely inside the spring separator 170. At the same time, the upper end surface 194 of the needle valve is not laterally restricted in any way by the washer 151 above it, or by the lower face of the block 111. Thus, when the needle valve returns to its normal closed position, it centers itself on the valve seat 166 at the lower end of the accumulator, and the upper end portion of the needle valve member positions itself wherever necessary in order to align with the lower end. It is the support means at the upper end of the needle valve which permits it to function in this matter.

An important feature of the needle valve operation is that it is closed only by the forces of spring 210 and the pressure differential across the needle valve stem. Because the valve face 192 has a slightly smaller radius than valve seat 166, the closing action occurs rapidly and smoothly, with minimal wear on the valve parts.

XI. OPERATION OF THE UNIT INJECTOR ASSEMBLY (FIGS. 2, 12 and 13)

The operation of the unit injector assembly in accordance with the present invention has already been described in general terms in conjunction with the schematic diagram of FIG. 2.

Now that the specific mechanisms of the preferred embodiment of the unit injector assembly have been described in conjunction with the detailed drawings thereof, it is appropriate to refer to FIGS. 12 and 13 which illustrate an example of the actual operation of the device at 5700 rpm.

As shown in FIG. 12, the voltage pulse 36 causes the solenoid valve to open, but only after a delay of about 3.0 milliseconds. The common outlet port 33 had previously been bled to zero pressure level through the fluid return or drain port 32. The inward flow of fuel from the inlet 31 causes its pressure to initially rise rather rapidly, but then more slowly since it is necessary to perform work in moving the large piston 130 of the hydraulic intensifier downward. Thus as shown in FIG. 12, as the intensifier pistons travel through their range of movement, the pressure in the low pressure chamber 145 rises to the level of the supply pressure (about 1,500 psi). Even before this action is completed, the voltage pulse ends and after a delay of about 2.3 milliseconds the solenoid valve closes.

Closing the solenoid valve causes the T-valve to close. The pressure in the high pressure chamber 150, which is also the pressure applied to the upper end surface 194 of the needle valve, drops sharply (see FIG. 12). The accumulator chamber 150a pressure drops rapidly, but less so. The differential between these two pressures is applied to the needle valve member for driving it upward against the force of big spring 210. Near the upper part of FIG. 12 is shown the actual motion or displacement of the needle valve member 190. As shown there, the maximum displacement of the needle is only a little over 0.40 millimeter or 0.016 inches, because that is the spacing between the upper end of the needle valve member and the washer 151 which acts as a bumper to limit needle movement.

A very small displacement of the needle is sufficient to initiate a full flow of the fuel through the orifices. The uppermost curve in FIG. 12 illustrates an example of the rate at which fuel is injected into the combustion chamber of an engine cylinder.

XII. TIMING THE INJECTION

The timing of the fuel injection is established by the end of voltage pulse 36, which causes solenoid 30 to return to its closed position after the aforementioned time delay of about 2.3 milliseconds. The mechanical closing of the solenoid then causes the injection of the fuel to occur almost immediately thereafter.

The time duration required for the fuel injection to be completed depends upon various design constants of the apparatus. The completion of the injection is determined by the characteristics built into the unit injector assembly, rather than being timed or controlled from some external source.

XIII. ADJUSTING (CONTROLLING) THE FUEL CHARGE

Once the fuel system is primed and the engine is operating at a steady speed and load, the unit injector assembly operates in accordance with the balanced conditions as shown by the curves in FIGS. 12 and 13. That is, after the injection of each fuel charge, the fuel pressure inside the accumulator returns to the residual pressure level for which the accumulator was designed. Upon the next actuation of the hydraulic intensifier, that pressure level must be equalled and slightly exceeded before the T-valve will open and admit additional fuel from the compression chamber.

During this operating condition, a fuel charge whose quantity is selected in terms of its volume at a specified pressure is transferred from the compression chamber into the accumulator. For example, a typical fuel charge is 30 cubic millimeters at atmospheric pressure. The quantity of this fuel charge will be slightly less than the total amount of fuel that was held in the compression chamber 150 and the metering duct 118b which extends between chamber 150 and check valve 119. When this predetermined fuel charge passes into the accumulator, it may increase the total quantity of fuel contained in the accumulator chamber 150a by approximately five percent. This is made possible by the compressibility of the fuel. For example, the internal capacity of the accumulator may be 700 cubic millimeters (i.e., $700 \times 0.05 = 35$ cubic millimeters). Since an operating condition that is in hydraulic balance has been achieved, the quantity of the fuel charge injected from the accumulator into the combustion chamber will be almost precisely the same as the quantity that was transferred from the compression chamber into the accumulator.

It is important to note that with this invention the function of metering the desired mass (as distinguished from volume) of the fuel charge to be injected is accomplished in the accumulator charge of the injector. Specifically, the mass of each fuel charge injected is metered or determined by the selected fixed volume of the accumulator chamber and by (and a direct function of) the difference between the peak pressure inside the accumulator nozzle and the pressure at which the tip valve closes. Although there is a slight pressure drop between the compression chamber and the accumulator (across the T-valve), the mass of the injected fuel charge is also a direct function of the volume of the accumulator chamber and of the difference between the peak pressure in the compression chamber and the nozzle tip valve closing pressure (fuel injection threshold pressure) of the accumulator. The quantity of fuel transferred into the compression chamber simply replaces the previously injected fuel charge.

When it is desired to change the power and/or speed of the engine, positive controls must be exercised. In accordance with the present invention, the preferred method of making such adjustments in the quantity of fuel charge is by adjusting the supply pressure level. This action was discussed previously in connection with the electrical control system 78 and its output line 90 that carries signals to the rail pressure regulator 15.

The quantity of fuel charge may also be adjusted by changing the duration of the time interval through which the hydraulic intensifier operates. That is, the start of the voltage pulse 36 can be advanced or retarded. In general, the voltage pulse commences an appreciable portion of the engine cycle in advance of the time when injection is to occur, and the intensifier builds up pressure in the compression chamber 150 for at least several milliseconds. See FIG. 11, wherein a combination of a solid line and a dotted line indicate that the point of commencement of the voltage pulse 36 is subject to adjustment. In that connection it will be noted from the particular example of FIG. 12 that a time interval of about 9 milliseconds is required for the intensifier pistons to reach the maximum displacement, and a time interval of about 10 milliseconds is required for the low pressure piston to return to its initial position. Fluid pressure in the low pressure chamber 145 remains at a low pressure until the large piston has returned to its initial upper position; then the pressure in chamber 145 and common output terminal 33 drops to zero. There follows a dead space or unused time interval in the engine cycle, when the capabilities of the unit injector assembly are not being utilized. Increasing or decreasing this unused time interval also involves a concurrent decrease or increase in the period of time that the solenoid valve is open. By making this adjustment to the length of time the solenoid valve remains open, the subsequent length of time that the hydraulic intensifier is able to operate can in turn be increased or decreased, and the quantity of the fuel charge produced by it can be adjusted accordingly.

In addition to adjusting the fuel charge by adjusting the level of the rail pressure, hydraulic control may also be achieved by adjusting the pressure of the fuel return line, or by adjusting pressure of a selected separate source supplying the inlet check valve to the intensifier chamber. Alternately, any combination of the three types of adjustments may be used.

Furthermore, by means of the microprocessor the adjustment of the duration of the voltage pulse, and the adjustment of the hydraulic pressures supplied to the injector unit assembly, may be used in conjunction with each other, in varying degrees, as desired.

XIV. MATHEMATICAL EXPLANATION OF OPERATION

In accordance with the present invention the quantity of each injected fuel charge is defined by the following relationships:

$$Q = K \times V_{ac} \times (P_{max} - P_{min}) \quad (1)$$

$$P_{max} = P_{rail} \times E \times I \quad (2)$$

(neglecting the small pressure drop across the T-valve)

$$P_{min} = P_{rail} + P_{spring} \quad (3)$$

(neglecting the small pressure drop across the T-valve) wherein:

Q is the quantity of fuel that is metered and then injected into the combustion chamber for the next firing;

K is the compressibility factor for the fuel, a single valued function of pressure and temperature which can be considered a constant for relatively small changes in pressure;

$V_{ac}$ is the accumulator volume;

$P_{max}$ is the maximum accumulator pressure;

$P_{min}$ is the minimum accumulator pressure;

$P_{rail}$ is the common rail supply pressure;

I is the intensifier ratio;

E is the intensifier effectiveness which is the ratio of actual pressure intensification to theoretical pressure intensification; and $P_{spring}$ is that portion of the needle valve closing pressure which is attributable to its spring.

By combining the initial set of equations the following additional relationship is obtained:

$$Q = K \times V_{ac} \times (P_{rail} \times E \times I - P_{rail} - P_{spring}) \quad (4)$$

This single equation defines the quantity of fuel which is metered in the accumulator injector and is then injected into the combustion chamber for the next firing.

It will be noted that in Equation (4) the only parameters which become variables during the operation of the system are the rail pressure, $P_{rail}$ and the ratio E which indicates the proportion of available pressure multiplication that is being utilized. It will be realized that the value of E is determined by the "on" time of the solenoid valve, and asymptomatically approaches 1.0 with increasing "on" time.

An important characteristic of the invention is the manner in which changes in the metered fuel charge are achieved. By applying a differential calculus type of analysis to Equation (4) the following additional relationship may be derived:

$$Q + \Delta Q = f(P_{rail} + \Delta P_{rail}, E + \Delta E) \quad (5)$$

where $\Delta P_{rail}$ is a change in rail pressure, $\Delta E$ is a change in intensifier effectiveness and $\Delta Q$ is a change in the metered charge. The notation $f(\ldots)$ denotes a function of the variables contained within the brackets. Thus, increases or decreases, $\Delta Q$, in the charge to be metered may be controlled by varying either the rail pressure, $P_{rail}$ or the intensifier effectiveness ratio, E, or both.

XV. OPTIMIZING ENGINE PERFORMANCE

An inherent feature of the fuel supply system of the present invention is that the hydraulic power requirement to operate the fuel injectors is relatively constant throughout the entire engine cycle, so that the peak power demand is greatly reduced.

As mentioned previously, when the engine is idling the timing cycle of the electrical control system can be changed so that it coincides with an integral multiple of the normal number of crankshaft revolutions. Thus, a modified operating cycle of the engine can be accomplished to inject a fuel charge only half or one-fourth as often as the basic operating cycle. These cycles are appropriate for light load operation. A fuel charge is injected into each cylinder of the engine only once during an operating cycle.

This mode of operation not only saves fuel, but reduces the amount of exhaust pollutants. In general, individual injection and ignition cycles are selectively eliminated to improve engine performance.

Another feature of the present invention is the utilization of the electrical control system to control the operations of the individual cylinders differently from each other. That is, for example, in the first cylinder of the engine the hydraulic intensifier unit may be turned on for 9 milli-seconds, while in the second cylinder the hydraulic intensifier may be turned on for 9½ milliseconds, and in the third cylinder for only 8½ milliseconds.

This method of control makes it possible to accomplish a "fine tuning" action. This compensates for any difference between the cylinders in order to give them a balanced operation and improve the overall efficiency and economy of the engine operation.

XVI. CONTROL CHARACTERISTICS

The basic fuel control methods described previously are utilized in performing the engine governing functions. Maximum speed governing, for example, reduces fuel delivery by any of the described methods in response to signals generated by the pulse generator and subsequent operations performed by the electronic control system. In a similar manner the pulse generator in cooperation with the electronic control system may perform a speed control or speed governing function by increasing the fuel delivery to increase engine speed or decrease fuel delivery to decrease engine speed. Thus a selected minimum speed or any speed within the operating range of the engine may be governed.

According to the present invention a sequence of electronic timing signals is generated, and is repeated once each engine cycle. For improved performance at part load, cycles may be selectively eliminated.

XVII. PRIOR ART DISTINGUISHED

Since Luscomb, and Straubel or Falberg in combination with Luscomb, formed the primary basis of rejection of some of the claims in the original application, the applicants have prepared a detailed analysis giving the significant differences between their devices and the cited prior art. It is respectively submitted this will adequately illustrate both the aplicants' unique and patentable features over Luscomb and that to combine elements of Straubel or Falberg with Luscomb, even if such were obvious, would not duplicate the applicants' invention or its operation.

A few actual and apparent similarities exist between Luscomb and Beck, et al., such as a three-way solenoid valve, an intensifier piston and a needle valve chamber. However, there exist fundamental differences in the method of metering, the actuation of the intensifier piston, and in the manner of initiating, accomplishing, and terminating the injection of the fuel charge into the cylinder.

More specifically, Luscomb meters first, and thereafter accomplishes pressurization and injection as essentially coterminous functions. In Beck the metering and pressurization are accomplished as coterminous functions, and only when they are completed is injection commenced. A further important distinction is that in Luscomb the time duration of the injection event is determined in whole or in part by the time duration of the pressurizing movement of the intensifier piston, while in Beck the injection event is terminated by the spring closing action of the accumulator injector and is independent of piston motion.

These substantial differences in principle, structure and operation offer important advantages in the Beck device, both in simplicity, the cost of manufacturing, and in being potentially more forgiving during the life of the injector in an engine.

Two basic differences between Beck and the cited art of significance are:

1. Unique to Beck is that his intensifier is allowed to achieve nearly its full pressure multiplication, and that his control of metering is more greatly influenced by the supply pressure in the fuel supply rail 16 rather by the influence of the time interval throughout which the solenoid valve 30 is energized. In fact, in the practical form of the Beck invention the duration of "valve on" time is used only to compensate for individual differences among the various cylinders of an engine, while the control of supply pressure becomes the sole means for controlling fuel quantity Q and hence engine power. FIG. 12 of the drawings shows the motion of the intensifier piston 130, 140 in relation to the time it is moving. The slope of its movement curve, particularly as it approaches maximum displacement, is quite gentle. Thus a change in the time that the valve is energized serves more as a trimming function than acting as a major element for metering.

2. Further unique to Beck is that forming the fuel charge with pressure metering, i.e. by controlling the common supply pressure to all injectors, and allowing sufficient time to each injector to reach its maximum pressure, is dependent upon the compressibility and density properties of the fuel.

In distinguishing between Beck and Luscomb it is to be noted that the Luscomb device is not of the accumulator type as he does not store a fuel charge under injection pressure in his chamber (78) between the metering chamber (50) and the nozzle tip prior to injection of the charge into the combustion chamber. The actual injection process is solely a function of, and is in synchronization with the movement of his intensifier piston (64,65). In Beck et al, injection is an independent event not synchronized with the downward movement of the intensifier piston.

A simple analogy of these differences can be made by comparing the injection process of Beck vs. Luscomb with that of a firearm:

In Beck, the "loading" (metering) is accomplished concurrently with the "cocking" (charging of the accumulator chamber 70). Thus by the end of the "loading" (metering) phase, the injector is also "cocked" and ready to "fire". The metering is controlled by the pressure reached in the "loading" phase. "Firing" (injection) occurs when the solenoid moves the control valve to *vent* the chamber 145 above the large end 130 of the piston and acts to "pull the trigger" to allow the stored energy ("powder charge") in the accumulator (the "cartridge") to power the injection of the charge through the nozzle holes.

In Luscomb, "loading" (metering) is a distinct, separate phase. "Cocking" and "firing" are the linked phases in synchronization with the movement of the intensifier piston.

Luscomb further teaches that prior to the time of the injection event the chamber above the intensifier piston large diameter end 64 is *open to the fuel reservoir* via passages in the shuttle valve assembly 38 and a throttling orifice 144a, adjustable only during calibration at assembly. In Beck et al at this point the large diameter end is *open to source pressure.*

In Luscomb the source pressure acts on the *small* end 66 of the intensifier piston prior to the injection event. In Beck the opposite occurs. The source pressure is on the *large* diameter end 130 prior to injection.

In Luscomb the *outermost* point of travel of the intensifier piston (towards the nozzle) always ends at the same place. The innermost point of travel is varied in order to meter a fuel charge, its stroke end-position being a function of the time interval during which the valve is energized and the influence of the calibrated orifice (144a) in the fuel return circuit. Without this manually adjustable resistance, the metered charge quantity could not be varied since the intensifier piston would always travel to the end wall of its large end chamber. Thus Luscomb meters the fuel charge during the movement of the intensifier piston to its innermost position. The accuracy of metering is greatly dependent, therefore, on the time that the solenoid valve's interval of being energized can be controlled and by the variable orifice means.

In Beck, the *innermost* point of piston travel remains fixed and the outermost point (towards the accumulator chamber and the nozzle tip) is determined by when the force generated against the large end of the intensifier piston from the supply pressure equals the force exerted on the opposite end by the accumulator chamber pressure. Restated, the piston arrives at an equilibrium position based on a pressure balance between the source pressure multiplied by the big end piston area and the injection pressure multiplied by the small end piston area *and the reduction in volume* of the fuel in the spaces below the piston (accumulator chamber 150a, compression chamber 150, etc.) due to the inherent compressibility of the fuel under the elevated pressures. The pressure determining the force on the piston large end is regulated as a function of engine power needs.

A significant disadvantage of the Luscomb system is that the quantity of fuel metered, or admitted to, the high pressure end of his intensifer is highly dependent on the pressure differential across the adjustable restriction orifice 144a imposed by the needle valve 144, 146 that is positioned when the injector is calibrated at assembly. This adjustable flow orifice also offers the engine operator a simple means during the calibration procedure to tamper with the fuel rate and increase it above that which the engine manufacturer might deem a maximum for a particular model. Further, the effect of temperature on calibration when flow rate control orifices are used is particularly important. Others have found that pressure-time metering requires compensating devices to accommodate variations in viscosity due to temperature changes in the fuel. Beck has no need for this restriction as in his device the piston always returns to the same innermost point.

Of further disadvantage in the Luscomb device is that the time available to fill his metering chamber 50 is severely limited by its being open to source pressure only during the very short time his solenoid can be energized. This greatly magnifies inherent variations in flow resistances, sliding friction of valve parts and solenoid coil characteristics. These variations are additive and, because they constitute a measurable time, can cause a greater cycle to cycle and/or cylinder to cylinder variance of fuel metering which may or may not be overcome by fine tuning of the microprocessor controls.

For example:
1. Luscomb must provide a high-flow second stage valve, as shown by the spool 38, because his system requires very high flow rates over very short time intervals for even relatively small engines. Thus, if 50 mm$^3$ are to be injected into the combustion chamber in one millisecond, then several times this flow rate is required through the valve 38 which because of the intensifer ratio results in a flow rate during the injection phase of approximately 300,000 mm$^3$ per second. Such high flow rates create inertial lags and flow losses that alter injection timing and delivery. In the case of a single-cylinder, four-stroke cycle engine running at 2,000 rpm, each engine cycle occupies 60 milliseconds. For these conditions the pump must supply several times the injection delivery in the above mentioned period of about 1 ms. This short duration flow is about 60 times the average flow. For a comparable application Applicants' invention would have a peak flow of less than six times the average flow.
2. The Luscomb valve shuttle pieces have inherently more sliding friction than does the floating ball design of the Beck valve.
3. The small diameter end of the intensifier piston contains a spill port annulus 56. Its purpose is to terminate injection by opening a passage from the metering chamber 50 to conduit 54 and then to inlet port 46. Thus displacement of the intensifier piston beyond the point at which the spill port opens is of no value as the displaced fuel is simply forced into the inlet passage. None of this displaced fuel is, therefore, delivered to the injector between the time of the opening of the spill port and the bottoming of the large diameter piston 62 on the face of the enlarged annulus 49a. The non-delivery portion of the intensifier stroke is an additional source of fuel metering error as this stroke portion must again be traversed during the retraction (metering) phase of the cycle. More hydraulic power also is required to push the intensifier through the non-productive portion of its stroke. In addition to the annulus 56, the axial and cross ports 70 in the piston end 66 further add to the manufacturing cost of the Luscomb device. The Beck design does not require this.
4. Extremely high pressure, short duration hydraulic pressure pulses or "spikes" would result from the inherent abrupt termination of flow when the intensifier piston bottoms out at the end of injection. Similar inertial pulses would result due to the abrupt shut-off of the shuttle valve 38 which terminates retraction of the intensifier. In the present invention, the flow at termination of pressurization is nearly zero, creating very low hydraulic pressure pulses.
5. A high supply pump pressure is required by Luscomb (5,000 psi is referred to) as the intensifier area ratio is limited to a relatively low value due to low response limitations of the shuttle valve 38. This necessitates heavier lines, fittings, and a more expensive pump in the pressure source system.

Conversely, the Beck et al. invention is importantly different in both function and construction. Features of this invention overcoming the detailed inherent deficiencies in Luscomb are the following:
1. In the Beck et al. injector, the compression chamber pressurizing time, i.e. the interval during which the solenoid is energized, can last at least one crankshaft revolution in a four-stroke cycle engine. The very short time for injection takes little of the overall cycle. Thus, a major portion of the engine operating cycle is available for pressurizing. As a result, variations caused by mechanical or fluid friction, as mentioned above, have little or no effect on the Beck device.
2. The quantity of fuel injected into the combustion chamber is precisely related to the pressure within the accumulator nozzle 70 at the time that injection commences.
3. At the start of injection of fuel into the engine cylinder, the pressure in the chamber 145 above the intensifier piston has been charged at an exponentially decreasing rate and has converged toward (asymtotically approached in a mathematical sense) the pressure in the fuel supply rail 16. The accumulator pressure at this point is the pressure in the chamber 145 multiplied by the intensifier area ratio. FIG. 12 in the drawings shows the accumulator pressure profile for a typical cycle. It can be seen that the rate of change of accumulator pressure approaches zero prior to the start of injection, whereby that pressure has become less sensitive to the duration of the charging phase as the duration continues. Thus, beyond a certain point the duration of the accumulator charging phase has little or no effect on peak accumulator pressure and hence, fuel delivery amount. In Luscomb, the final quantity is directly proportional to solenoid on-time. It is also to be noted that in Beck relatively large changes in the duration of accumulator charging time result in only small changes in injection pressure and fuel delivery. This characteristic permits very accurate adjusting of the fuel charge to be injected.

4. The primary control of fuel delivery in the applicants' injector is by adjustment of fuel supply rail pressure. The idea itself of varying source fuel pressure to meter is not new, one example being the successful Cummins PT (Pressure-Time) injection system; that system, wholly dependent on such a means of control, meters at low pressures (5-200 psi) into its injectors and thereby utilizes pressure and *time* to control fuel charge volume. However, the applicants' device utilizes the *compressibility and density properties* of liquids as a function of pressure. (Compressibility is defined as the specific change in density per unit pressure.) Since the compressibility and density for any given liquid are basic physical properties of that liquid, the mass present in a fixed volume is related directly to the pressure of the liquid. A corollary is that a fixed volume of liquid undergoing a change from one discrete pressure to another discrete pressure must also change its mass in an exact relationship to the volume and the two discrete pressure levels. It is thus possible to meter a liquid fuel charge by first selecting a fixed volume accumulator chamber and a needle tip valve closing pressure to set the minimum accumulator pressure, and then, by control means, adjusting the accumulator charging time and hence the maximum accumulator pressure. A slight adjustment of the fuel charge for individual cylinders is accomplished by altering the accumulator charging time.

5. As pressure builds and approaches equilibrium in the accumulator during the metering phase of the cycle, the flow rate of fuel entering the intensifier chamber 145 via the control valve 30 gradually decreases and approaches zero. The valve is thus switched to the "closed-to-supply, open-to-vent" position at this point in the cycle where the flow through the valve approaches zero. Only minimum hydraulic inertial pressure spikes are produced at the valve closing event.

6. Relatively low peak pump flow rate is required. Typically, the system is designed such that the flow into the intensifier 145 from the fuel supply rail would occupy about one complete revolution for a four-stroke engine. As mentioned above, this can be seen in the trace of the intensifier piston motion in FIG. 12. Using the same data as in the example cited for Luscomb's operation of a single cylinder, four-stroke engine running at 2,000 rpm, the maximum instantaneous fuel pumping rate required by the Beck device is less than about six times the average pumping rate, as contrasted with 60 times in Luscomb.

In view of the above explanatory information distinguishing the applicants' device from Luscomb the following brief comparison of the Luscomb-Straubel combination with the Beck et al. device should suffice.

In Straubel, the adjustable regulator 32 in the inlet line 31 is essentially regulated to a constant pressure of about 50 bar (approximately 730 psi). The purpose of adjusting this pressure is to effect pressure changes in the line to the injector in order to compensate for temperature variations of the fuel. It is not the primary fuel metering control nor is it under direct operator control for changing the fuel rate to the engine under such conditions as increased power at constant speed or under acceleration. Thus the applicants' device is not readable on Luscomb in view of Straubel as the use of an adjustable pressure regulator to control metering in conjunction with fuel compressibility and density is not obvious.

A discussion of the Beck et al. device in comparison with Luscomb in view of Falberg is now respectfully submitted to show that the applicants' device could not be achieved as a matter of obvious design choice by substituting the Luscomb nozzle injector 78 for the Falberg accumulator injector 28 and its associated elements.

While it is true that a Luscomb-Falberg combination injector could probably be made to work, it would neither be practical nor efficient and, because of inherent injection timing problems, could cause damage to the engine. In addition such a combination of Luscomb-Falberg would retain most or all of the deficiencies of Luscomb.

It may be logical to assume that the volumetric metering of Luscomb can be substituted for the volumetric metering of Falberg, and thus the two devices may be combined. That would be difficult enough. To further assume, on a highly imaginative basis, that the resulting combination could then be utilized to accomplish Applicants' pressure metering method, would present obstacles that cannot reasonably be overcome. Thus, a comparison of a Luscomb-Falberg combination with the Beck et al. device may be best understood by explaining the operational modifications necessary if the Luscomb-Falberg combination were to be converted to the applicants' system (obvious element deletions will not be itemized):

1. Change the 3-way control valve from "normally open" to "normally closed".
2. Change the metering function to occur when rail pressure is "on" rather than when it is "off".
3. Eliminate the spill port annulus (56) in Luscomb and block passage 98.
4. Change the initiation of injection to occur when the intensifier piston is moving *upward* rather than *downward*.
5. Reach peak pressure in the accumulator chamber when the intensifier piston velocity is nearly *zero* rather than when the velocity is a *maximum*.
6. Pressurize the accumulator chamber in a time interval equal to about *one* rather than about *one-fifteenth* of an engine revolution.
7. Change the metering function to depend upon rail pressure rather than largely on a calibrated vent orifice and "solenoid on" time.

8. Use an operator-controlled variable rail pressure rather than an essentially fixed rail pressure.
9. Make the metering function primarily independent of solenoid-on time rather than mainly dependent on that time interval.
10. When the solenoid is de-energized, keep the system unpressurized rather than pressurized.

While some of the above changes required to convert a Luscomb-Falberg combination to the applicants' system might be individually obvious, it is submitted that none of changes 3 to 9 would be obvious. More importantly, it is clear that applicants' invention *viewed as a whole* would not be obvious in view of these references.

XVIII. ALTERNATIVE FORMS

Many variations are possible in the details of the mechanisms that are illustrated in FIGS. 3 through 10, inclusive. Furthermore, in accordance with the present invention a method of controlling engine operation for optimum performance is provided, which may not depend upon the specific type of unit injector assembly that is schematically described in FIG. 2.

For example, the pump 12 may be of the variable displacement pressure-compensating type with which pressure regulator 15 would not be required.

It will also be understood that FIGS. 12 and 13 illustrate the operation of the invention under one particular set of conditions, and that both the operating speed and the design parameters of the apparatus may be modified with corresponding modification in the operation.

XIX. CASCADED CONTROL VALVES

Figure 15:
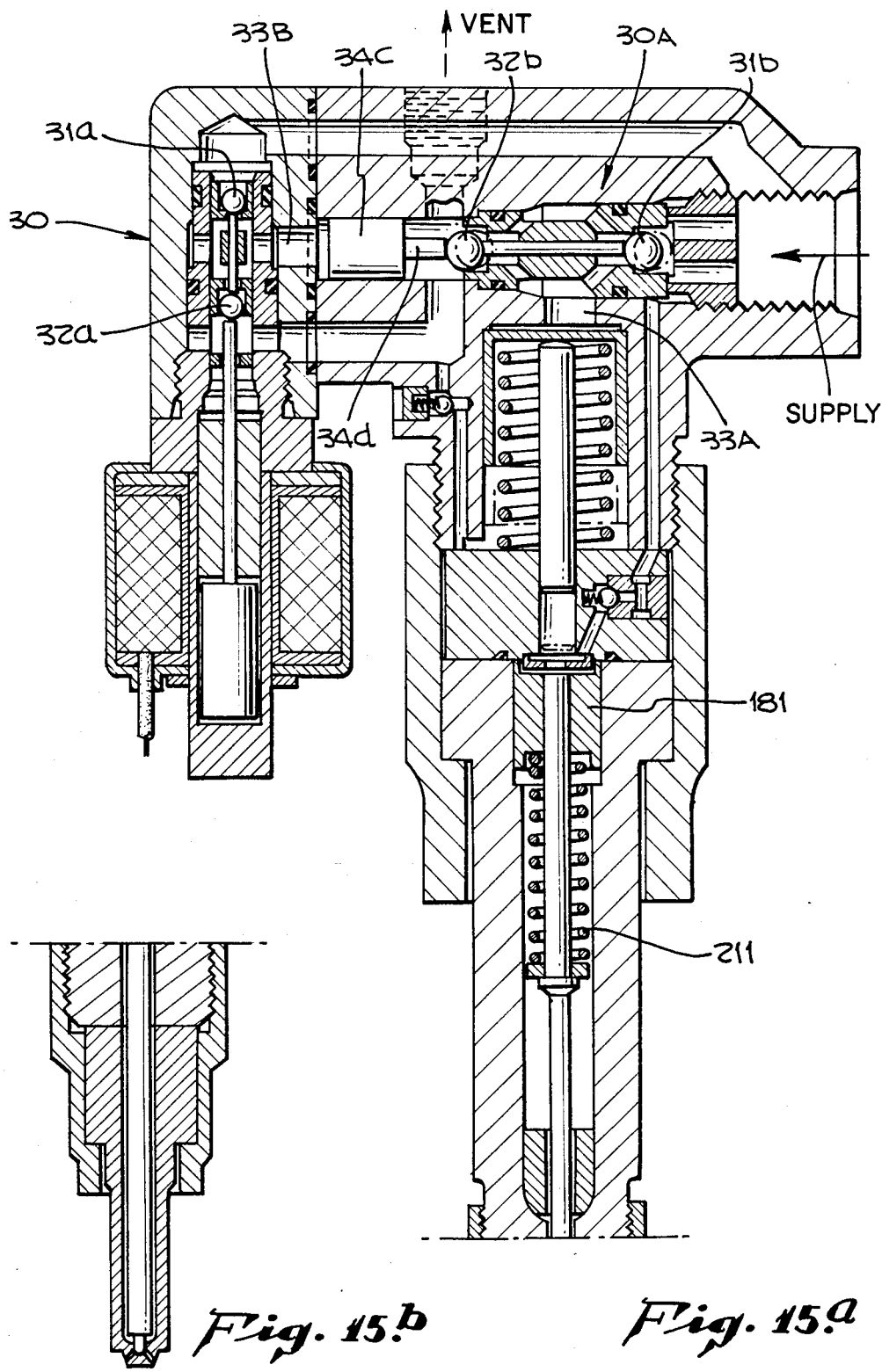

FIGS. 14 and 15 show the contruction of a two-stage electrically operated unit injector assembly which is similar to the previously described construction except that a second valving stage is included having greater flow capacity for larger engines. In this construction the previously described solenoid valve 30 serves as a master or pilot stage to operate a significantly larger slave valve 30A. The larger slave valve 30A is of similar construction to the pilot valve having two ball poppet type valving elements which connect a common port 33A alternately to either the supply line or to the drain line. While the ball valves 31a, 32a of the pilot valve 30 may typically be of 3/32" diameter, the ball valves 31b, 32b of the slave valve 30A are typically of twice that diameter, or 3/16".

A piston 34c having a pusher pin 34d is located coaxial with the slave stage and on the vent end of the slave stage. The end of the pusher pin, which is opposite the piston, abuts the drain ball 32b of the slave stage.

A fluid supply line 33B connects a cavity behind the piston to the common port of the solenoid pilot valve. The common port 33A of the slave stage connects through a fluid passage to the large diamter piston of the intensifier.

Another feature of the embodiment of FIG. 15 is that a modified form of T-valve 181 is controlled by a single spring 211. It will be understood that the T-valve and spring arrangements of FIG. 5 and FIG. 15 are generally interchangeable.

When the solenoid pilot valve 30 is in the open-to-supply position, fuel is supplied to piston 34c which moves the slave stage to the open-to-supply position. Conversely when the solenoid (pilot) valve is in the open-to-drain position, the piston cavity is open to drain, and the slave valve returns to the closed-to-supply, open-to-drain position. Hence, the operation of the slave stage in conjunction with the intensifier, the accumulator injector, and check valves is identical to operation without the slave stage, except that the valve passage sizes are larger, permitting higher flow rates and increased fuel delivery.

XX. CONTROL FROM TWO PRESSURE SOURCES

Either the embodiment of FIGS. 1–13 or the embodiment of FIGS. 14, 15 may, if desired, be controlled from two pressure sources rather than a single source.

Thus as shown in FIG. 14 a cut-off valve 19B may be inserted between fuel supply rail 16 and the check valve 19. An alternate fuel source at a selected pressure may be connected via line 19C to the input side of check valve 19. Then, when valve 19B is cut and line 19C is activated, the fuel charges for the high pressure chamber 40 are supplied solely from the alternate fuel source. At the same time, energy for operating the hydraulic intensifier 40 continues to be provided by the common rail supply line 16, which can be operated either with liquid fuel or with some other liquid having desirable properties.

When the fuel source and the hydraulic energy source are thus separated, the equation describing the quantity of the fuel charge becomes as follows:

$$Q = K \times V_{ac} \times (P_{rail} \times E \times I - P_{selected\ source} - P_{spring}) \quad (6)$$

(again neglecting a small pressure loss across the T-valve)

Thus the control of fuel charges entails three variables—the common rail pressure $P_{rail}$, the intensifier effectiveness ratio E (based on "valve on" time), and the pressure of the alternate fuel source.

XXI. PRESSURE CONTROLLED INJECTOR WITHOUT PRESSURE INTENSIFICATION

FIG. 16 shows a schematic diagram while FIGS. 17 and 18 show the actual construction of a simplified unit injector assembly 101 which is similar to assembly 100 shown in FIGS. 2 through 10. In this construction the intensifier has been deleted and the common outlet port 33 of solenoid 30 communicates directly with the modified T-valve member 180A and the flat upper end surface 194 of needle valve member 190. Metering duct 118, check valve 119, check valve 121, and block 111 (FIG. 5a) have also been eliminated in this construction. All other features ae retained.

In FIG. 18, cylindrical member 196 is pressfitted into block 110A, and its lower end has a lapped surface which provides a seal against the upper end of modified T-valve member 180A. Thus the modified check valve 60A includes T-valve member 180A, cylindrical member 196, and the cylindrical upper end of needle 190. The concentric inner cylindrical member 197 is loosely fitted and acts as a needle stop, like washer 151 of FIG. 5.

FIGS. 19 and 20 are curves of pressure versus time for the embodiment of FIGS. 16–18, comparable to FIGS. 12 and 13 for the first embodiment. As shown in FIG. 19, after firing of the nozzle the pressure level remaining in the accumulator chamber equals the sum of its spring pressure and the drain line pressure.

The function of the simplified electrically operated unit injector is identical to the previously described injector having an intensifier except that the maximum accumulator pressure is slightly less than the fuel supply or common rail pressure. With the solenoid in the energized position, pressure in the accumulator increases and approaches rail pressure. As in the previously described cases, switching the valve from the open-to-supply to the open-to-drain condition causes the T-valve to close and the pressure on the top surface of the upper portion of the needle valve member to decrease. When the pressure on the top surface of the upper portion of the needle valve member decreases to a sufficiently low level, the needle valve lifts from its seat and causes fuel to be sprayed through holes in the injector tip.

The amount of fuel injected is related to accumulator volume, the maximum and minimum accumulator pressures, and the compressibility factor for the fuel. The minimum accumulator pressure in this case is spring pressure plus drain line pressure rather than spring pressure plus rail pressure. The relationship can be expressed in equation form as follows:

$$Q = K \times V_{ac} \times (P_{rail} \times E - P_{drain} - P_{spring}) \qquad (7)$$

PERFORMANCE COMPARISON FOR USE OF THE INVENTION FOR GASOLINE AND OTHER SPARK IGNITION ENGINES

The characteristic of the invention which separates the charging event from the injection event permits very short duration of injection without the flow variations typical of conventional pulse-width modulated systems. FIG. 21 shows needle motion, injection rate, and spark timing where fuel injection begins about 360 crankshaft degrees before the spark is fired, such as when injecting fuel into the intake port or engine manifold. FIG. 22 illustrates in-cylinder injection beginning about 70 degrees before the spark is fired. FIG. 23 shows the typical relationship between injection duration vs quantity. For the conventional low pressure, pulse-width modulated system, precise control of fuel quantity is very difficult to attain for injection durations less than about 2 milliseconds. For the pressure-metered accumulator system of this invention, fuel quantity is essentially independent of injection duration, hence very fast injection becomes quite practical.

The present invention has been described in considerable detail in order to comply with the patent laws by providing a full public disclosure of at least one of its forms. However, such detailed description is not intended in any way to limit the broad features or principles of the invention or the scope of patent monopoly to be granted.

What is claimed is:

1. The method of injecting fuel into a combustion chamber of an internal combustion engine, comprising the steps of:
   (a) selecting an accumulator type fuel injector having a fuel input, and characterized by the fact that the withdrawal of applied pressure from its input initiates the injection of a fuel charge;
   (b) placing said fuel injector in operative relation to the combustion chamber;
   (c) selecting an electronically controlled three-way valve for selectively admitting fuel into said accumulator type fuel injector;
   (d) coupling said valve to said injector;
   (e) coupling a source of liquid diesel fuel to said valve; and
   (f) whenever it is desired to inject a fuel charge into the combustion chamber, applying an electronic control signal to said valve to open said valve for a selected period of time;
   whereby at the end of said selected period of time when said valve closes to pressure and opens to vent, said accumulator type injector causes the injection of the fuel charge into the combustion chamber to be initiated; the termination of injection of the fuel charge being controlled by said accumulator type fuel injector and not by said valve or said electronic control signal.

2. The method of operating an internal combustion engine having a normal operating cycle during which a single fuel charge is injected once per cycle into each combustion chamber of the engine, comprising the steps of:
   (a) generating a periodically repeated sequence of electronic timing signals;
   (b) sensing the revolution of a revolving shaft of the engine;
   (c) in response to the sensed shaft revolutions, synchronizing said sequence of electronic timing signals with a normal operating cycle of the engine;
   (d) then utilizing said sequence of electronic timing signals to control both the injection of fuel charges into the combustion chambers of the engine, and the ignition of said fuel charges, so as to maintain said normal operating cycle of the engine;
   (e) then altering said sequence of electronic timing signals so that it occupies a time period which is an integral multiple of the time period it previously occupied, but with the same spacings between the individual injection signals, so that the engine then operates on a modified cycle which corresponds to said integral multiple times the number of engine revolutions contained in the normal operating cycle;
   whereby it is possible to maintain substantially the same size of fuel charge supplied to each combustion chamber of the engine while decreasing the number and frequency of such fuel charges, thereby reducing the total fuel comsumption of the engine while maintaining its combustion efficiency.

3. Fuel injection apparatus for a diesel engine comprising, in combination:
   (a) a source of liquid fuel at a predetermined common supply pressure;
   (b) a separate unit injector assembly associated with each combustion chamber of the engine;
   (c) means for supplying one electronic control signal per engine cycle to each of said unit injector assemblies in order to control the repetitive injection of a prescribed fuel charge into the combustion chamber of the associated cylinder;
   (d) each of said unit injector assemblies including a pressure intensifier, a solenoid valve for controlling the admission of a fuel charge to said pressure intensifier, an accumulator type injector, and a non-return valve coupling the output of said pressure intensifier to said accumulator injector;
   (e) said control signal being operative once in each engine cycle to open said solenoid valve an appreciable portion of said cycle in advance of the injection of the fuel charge, said control signal also being operative to close said solenoid valve at the time when the fuel charge is to be injected;
   (f) said pressure intensifier being operative to raise the pressure of the fuel charge received therein to at least several times the pressure level of said source, the closing of said solenoid valve being operative to relieve the pressure in said intensifier;

(g) said non-return valve opening in response to the opening of said solenoid valve when the fuel pressure produced by said pressure intensifier exceeds the residual pressure in said accumulator injector so that fuel at the intensified pressure is transferred to said accumulator injector, and closing in response to the closing of said solenoid valve;

(h) said accumulator injector being responsive to the closing of said non-return valve and the release of pressure in said intensifier for causing the injection of the fuel charge, the injection of the fuel charge being then powered by the differential pressure between the intensified fuel pressure in said accumulator injector and the pressure in the combustion chamber; and (i) means for adjusting at least one of the pressure level of said common supply pressure, and the time interval during which said solenoid valve is open, in order to correspondingly adjust the magnitude of the fuel charge to be injected into said cylinder.

4. Fuel injection apparatus as in claim 3 wherein the engine includes a plurality of combustion chambers, and said injection apparatus includes a corresponding plurality of unit injector assemblies, each unit injector assembly being associated with the respective one of the engine cylinders.

5. Fuel injection apparatus in accordance with claim 3, wherein said fuel source includes a pump having its output coupled to a pressure regulator, and means for adjusting the pressure level of said regulator.

6. Fuel injection apparatus in accordance with claim 3, which includes an electrical control system having a separate output line coupled to each of said injector assemblies, and having means associated with said output line for generating a voltage pulse during each engine cycle; the leading edge of said voltage pulse causing said electronically controlled valve of the associated injector assembly to open, and the trailing edge causing said solenoid valve to close.

7. Fuel injection apparatus as claimed in claim 6 which further includes a separate output from said electrical control system coupled to said pressure source for adjusting said supply pressure.

8. Fuel injection apparatus as claimed in claim 6 wherein said electrical control system includes means for individually adjusting the various pulses of voltage supplied to the respective output lines coupled to corresponding injector assemblies.

9. Fuel injection apparatus as claimed in claim 3 which includes means for adjusting both the pressure level of said common supply pressure, and the time interval during which said solenoid valve is open, in order to adjust the magnitude of the fuel charge to be injected into said combustion chamber.

10. Fuel injection apparatus as claimed in claim 3 wherein said pressure intensifier includes a large piston and a small piston coupled together, a low pressure chamber to which the operative surface of said large piston is exposed, and a metering and intensifying chamber to which the operative surface of said small piston is exposed.

11. Fuel injection apparatus as claimed in claim 10 which further includes a fuel return line, and wherein said solenoid valve is a three-way valve, the operation being such that when said valve is open said low pressure chamber is coupled to said fuel source but not to said fuel return line, while when said valve is closed the opposite relationship exists.

12. Fuel injection apparatus as claimed in claim 11 which further includes a metering duct coupling said fuel source to said metering and intensifying chamber, whereby said metering and intensifying chamber is always filled with liquid fuel; and a non-return valve positioned within said metering duct to prevent the flow of fuel from said metering and intensifying chamber back to said source.

13. In a fuel injection system for an internal combustion engine wherein fuel supplied at substantially constant pressure is converted to a series of metered charges at a pressure much greater than the supply pressure, an injector module comprising, in combination:

an elongated housing having an entry port at one end thereof and a spray tip at its other end;

an elongated needle valve member disposed within said housing, one end of said needle valve member having a transverse flat surface which is exposed to said entry port, the other end of said needle valve member having a valve face normally engaging a valve seat formed within the lower end of said housing adjacent said spray tip;

a spring separator disposed within and secured to said housing intermediate the two ends thereof, but located closer to said entry port than to said spray tip;

said needle valve member having an annular shoulder formed therein intermediate its ends;

a first helical spring extending between said shoulder of said needle valve member and one side of said spring separator for urging said needle valve member against said valve seat, said first spring having a comparatively high spring force;

a valve member having a circular opening, said valve member being disposed within said housing with said one end of said needle valve member extending through said circular opening thereof;

both said valve member and said needle valve member being normally exposed to said entry port; and a second helical spring extending between said valve member and said spring separator for urging said valve member towards said entry port, said second spring having a low spring force compared to said first spring.

14. The apparatus of claim 13 wherein said valve member is generally cup-shaped, said circular opening being formed in its end wall, and its circumferential wall extending toward said spring separator and surrounding said second helical spring.

15. The apparatus of claim 13 wherein said spring separator is of substantially annular configuration.

16. Fuel injection apparatus in accordance with claim 3, wherein said fuel source includes a variable displacement pressure-compensating type pump, and means for adjusting its output pressure.

17. The method of injecting liquid fuel charges into a combustion chamber of an internal combustion engine, comprising the steps of:

(a) providing a source of liquid fuel under controllable pressure;

(b) selecting a pressure intensifier having an intensifier piston and having a pressure intensifying chamber with a selected volume;

(c) selecting an accumulator type fuel injector having an accumulator chamber with a selected volume;

(d) admitting fuel from said source to fill said intensifying chamber;

(e) once during each firing cycle of said engine, constraining the fuel in said intensifying chamber against returning to said source, so that the fuel in said intensifying chamber may be compressed;

(f) then, commencing an appreciable portion of the engine operating cycle in advance of the time when injection is to be accomplished, and throughout an interval whose duration is longer than the time required for injection, drawing a quantity of fuel from said source and utilizing its pressure to gradually reduce the volume of said intensifying chamber until a selected pressure level of said fuel in said intensifying chamber is reached which is higher than the nozzle tip valve closing pressure of said injector;

(g) placing said pressure intensifying chamber in fluid communication through a non-return valve with said accumulator type fuel injector;

(h) transferring fuel from said intensifying chamber into the accumulator chamber of said accumulator type fuel injector at said selected pressure level; and (i) when injection is to be initiated, then releasing the pressure within said intensifying chamber by reversing the direction of motion of the intensifier piston, so that the non-return valve immediately closes off the fluid communication between said intensifying chamber and said accumulator chamber of said accumulator type fuel injector, and such release of pressure from within said intensifying chamber causes the nozzle tip valve to open;

whereupon said injector then discharges into the combustion chamber a fuel charge whose mass is determined in part by the fixed volume of the accumulator chamber and is linearly related to the difference between said predetermined pressure level and said tip valve closing pressure.

18. Fuel injection method in accordance with claim 17 wherein said nozzle tip valve closing pressure of said injector is equal to the sum of said source pressure plus a pressure caused by a needle valve spring.

19. In an internal combustion engine fuel injection system, a control module for receiving liquid fuel from a substantially constant pressure supply line and producing a repetitive series of fuel charges of a metered quantity and at a substantially higher pressure level, said control module comprising, in combination:

a three-way solenoid-controlled valve having a fuel inlet port, a fuel drain port, and a common outlet, said valve being operative in one position to couple said common outlet to said inlet port only and being operative in another position to couple said common outlet to said drain port only;

a hydraulic intensifier having a large piston and a small piston in oppositely facing directions, a low-pressure chamber communicating with the face of said large piston, and a high pressure chamber communicating with the face of said small piston;

a metering duct providing direct fluid communication from said fuel inlet port to said high-pressure chamber, and having check valve means for preventing the flow of liquid fuel in the reverse direction;

a passageway coupling said common outlet to said low-pressure chamber so that in said one position of said valve, liquid fuel flows into said low-pressure chamber and advances said small piston so as to pressurize fuel stored in said high-pressure chamber, and in said alternate position of said valve, liquid fuel flows out of said low-pressure chamber to said drain port and causes said small piston to retract; and said small piston being imperforate, and said high pressure chamber having a single outlet port disposed directly opposite the face of said small piston.

20. The method of controlling the mass of liquid fuel charges injected into a combustion chamber of an internal combustion engine, comprising the steps of:

(a) providing a source of liquid fuel at a selected pressure level which is nominally constant but selectively variable in order to adjust the mass of the fuel charges that are to be injected;

(b) establishing a threshold pressure level for the injection of fuel into the combustion chamber;

(c) periodically selecting a quantity of liquid fuel from said source;

(d) then isolating said selected fuel quantity from said source;

(e) multiplying the pressure level of each such selected fuel quantity by a selected multiple such that its pressure level then exceeds said threshold pressure level; and (f) in response to and under the control of each such selected fuel quantity those selected pressure has been thus multiplied, injecting into the combustion chamber a charge of liquid fuel whose mass is a direct function of the volume of the chamber in which the selected fuel quantity is stored and of the difference between said multiplied source pressure and said threshold pressure level.

21. The method of claim 20 wherein the mass of the fuel charge is adjusted by adjusting the time interval within which pressure multiplication occurs and thereby adjusting said selected multiple of pressure multiplication.

22. The method of claim 20 wherein an accumulator type fuel injector is selected which has a self-contained non-return valve at its input and a closing pressure corresponding to said threshold pressure level, and wherein each such selected fuel quantity having a multiplied pressure level is applied to the fuel input of said accumulator injector.

23. The method of claim 22 wherein the mass of the fuel charge is adjusted by adjusting the time interval within which pressure multiplication occurs and thereby adjusting said selected multiple of pressure multiplication.

24. The method of injecting fuel into an internal combustion engine having at least one cylinder with an associated combustion chamber, and of controlling both the quantity and the timing of each fuel charge that is injected into the combustion chamber so as to thereby control the engine operation, comprising the steps of:

(a) providing a source of liquid fuel under a predetermined pressure;

(b) selecting a unit injector assembly having
(1) a pressure intensifier including a larger and a smaller diameter piston having the capability of raising said fuel source pressure to a desired injection pressure,
(2) an electrically actuated control valve capable of being energized for a variably substantial part of an engine operating cycle to allow said intensifier to generate said injection pressure prior to the injection event; and (3) an accumulator storage chamber capable of storing liquid fuel under an elevated pressure level, which pressure level determines the fuel charge to be injected;

(c) coupling said fuel source to said control valve of said injector assembly;

(d) turning said control valve on and off once during each power operating cycle of said engine so that whenever said valve is turned on, a chamber adjacent to said larger intensifier piston is pressurized, thus causing the movement of said smaller piston through a distance sufficient to displace said fuel charge into said storage chamber under a selected injection pressure;

the movement of said smaller piston when the valve is energized being controlled by a balance of forces resulting from the pressure level of said fuel source, the pressure level on said intensifier pistons and the time interval during which said valve is energized;

(e) de-energizing said solenoid to open said control valve to a vent line and close said valve coupled to said source, thus initiating injection of said fuel charge into said combustion chamber; and (f) simultaneously with the turning off of said control valve, causing (1) said chamber adjacent to said larger piston, previously connected to said pressurized fuel source, to be connected to said vent line, said vent line leading to a fuel reservoir supplying said pressurized source and having a minimum flow resistance in order to allow said piston to return to the same fixed point at the end of each venting stroke, and (2) the discharge from said storage chamber of said fuel charge into said combustion chamber;

the instant of time each said fuel charge begins its injection into said combustion chamber being determined by the time when said control valve is opened to vent;

so as to selectively determine the power and acceleration of said engine.

25. The method according to claim 24 in which only said source pressure is adjusted.

26. The method according to claim 24 in which only the timing of said valve turn-off is adjusted.

27. The method according to claim 24 in which only the time interval throughout which said valve remains turned on is adjusted.

28. The method according to claim 24 in which at least two of said source pressure, duration of time valve is on, and valve turn-off time are adjusted.

29. The method of claim 24 in which all three of said source pressure, duration of time valve is on, and valve turn-off time are adjusted.

30. The method in accordance with claim 24 wherein the engine is a multi-combustion chamber engine having a plurality of unit injector assemblies, one for each combustion chamber, and all of said unit injector assemblies, while operating at different points of time during the engine cycle, are controlled in an identical fashion.

31. The method according to claim 30 wherein said source pressure is common to all injector assemblies.

32. The method according to claim 34 wherein the engine is a multi-combustion chamber engine, having a plurality of unit injector assemblies, one or more for each said combustion chamber, and wherein at least one of said source pressure, duration of time the valve is on, and valve turn-off time is adjusted differently for one chamber of the engine than it is for another chamber of said engine.

33. The method of controlling the mass of liquid fuel charges injected into a combustion chamber of an internal combustion engine, comprising the steps of:

(a) providing a source of liquid fuel at a selected pressure level which is normally constant but selectively variable;

(b) providing a pressure intensifying means whose pressure multiplying movement is a function of said source pressure and the compressibility and density properties of the liquid fuel;

(c) establishing a minimum pressure level at which the fuel may be injected into the combustion chamber;

(d) periodically selecting a quantity of liquid fuel from said source;

(e) using said intensifying means to multiply the pressure level of each such selected fuel quantity by a fixed multiple such that its pressure level then exceeds said minimum pressure level;

(f) forcing said selected fuel quantity into an accumulator type storage chamber; and (g) in response to and under the control of each such selected fuel quantity whose selected pressure has been thus multiplied, injecting into the combustion chamber a charge of liquid fuel whose mass is a direct function of the volume of said chamber in which the selected fuel quantity has been stored and of the difference between said multiplied source pressure and said minimum pressure level.

34. The method of claim 33 wherein the mass of the fuel charge is adjusted either by adjusting said source pressure or by adjusting said minimum pressure level.

35. The method of claim 33 wherein the mass of the fuel charge is a direct function of said fixed multiple of pressure multiplication.

36. The method of claim 33 wherein said accumulator-type chamber has a self-contained, non-return valve at its input, and wherein each such selected fuel quantity having a multiplied pressure level is applied to said fuel input of said accumulator chamber.

37. The method of claim 36 wherein the mass of the fuel charge is adjusted by adjusting said source pressure or by adjusting said minimum pressure level.

38. The method of claim 36 wherein the mass of the fuel charge is a direct function of said fixed multiple of pressure multiplication.

39. An accumulator type fuel injection system for an internal combustion engine comprising, in combination:

(a) a unit injector for each combustion chamber of said engine;

(b) a three-way valve incorporated in each said unit injector and actuated by a corresponding separate solenoid;

(c) a fuel reservoir with passages leading to each of said three-way valves;

(d) a pump means to draw fuel from said reservoir in order to raise the fuel to a predetermined source rail supply pressure and having passages leading to each of said three-way valves;

(e) an accumulator chamber of predetermined volume in each said unit injector having an inlet check valve and an outlet needle valve;

(f) control means to control the level of fuel pressure generated by said pump means and to actuate each of said solenoids;

(g) passages controlled by each said three-way valve to pressurize or depressurize said corresponding inlet check valve as required;

(h) said check valve being in the form of a T-valve having a spring biasing means acting on one end, to serve both as said inlet check valve to said accumulator chamber and as a bushing for said needle valve; and (i) said needle valve having an upper stem which slideably operates within said T-valve bushing, and having a lower end which abuts a seat adjacent to a nozzle orifice leading into a combustion chamber of said engine;

whereby when said solenoid is energized by said control means the liquid fuel in said accumulator chamber is thereby compressed to both meter and store in said accumulator chamber a fuel charge to be injected whose mass is a function of the volume of said accumulator chamber, the compressibility and density of the fuel, and the pressure in said accumulator chamber; and whereby when said solenoid is de-energized by said control means the pressure above said T-valve and said upper stem of said needle valve is reduced, and said needle valve is triggered to lift off of said seat causing the injection of said fuel charge into said combustion chamber through said nozzle orifice using the energy of the compressed fuel in said accumulator chamber to accomplish the injection process.

40. An accumulator type fuel injection system for an internal combustion engine comprising, in combination:

(a) a three-way valve actuated by a solenoid;

(b) a fuel reservoir with passages leading to said three-way valve;

(c) a pump means to draw fuel from said reservoir in order to raise the fuel to a predetermined source supply pressure and having passages leading to said three-way valve;

(d) an intensifier piston having input and output ends;

(e) passages alternately connecting the input end of said intensifier piston with said source pressure or with said fuel reservoir as required;

(f) a control means to control the level of fuel pressure generated by said pump means and to actuate said solenoid;

(g) an accumulator chamber of predetermined volume having an inlet check valve, said check valve coupling the output end of said intensifier piston to said accumulator chamber; and (h) a needle valve seating at a nozzle tip orifice leading into a combustion chamber of said engine;

whereby when said solenoid is energized, the force created by said pressurized fuel source acting on the input end of said piston causes the movement of said piston to both meter, by said piston reaching an equilibrium position based on a balance of the hydraulic force acting on each end of said piston, and load under injection pressure into said accumulator chamber a fuel charge whose mass is a function of the volume of said storage chamber, the compressibility and density of the fuel, and the pressure in said chamber; and whereby when said solenoid is de-energized said piston input end is vented through passages having a minimum hydraulic resistance, thereby triggering the lifting of said needle valve and using the energy of the compressed fuel in said storage chamber to cause the injection of said fuel charge into said combustion chamber through said nozzle orifice.

41. The method of metering fuel charges and injecting them into a combustion chamber of an internal combustion engine by supplying fuel from a selected pressure source through a pressure intensifier chamber to an accumulator type fuel injector, and controlling the pressure multiplying action of the intensifier from a common rail source through a solenoid valve, in which the fuel quantity to be delivered is linearly related to the pressure of the common rail source, substantially in accordance with the relationship:

$$Q = K \times V_{ac} \times (P_{rail} \times E \times I - P_{selected\ source} - P_{spring})$$

wherein:

Q is the quantity of fuel to be burned that is metered and then injected into the combustion chamber;

K is the compressibility factor for the fuel;

$V_{ac}$ is the accumulator volume;

$P_{rail}$ is the common rail supply pressure;

I is the intensifier ratio;

E is the intensifier effectiveness which is the ratio of actual pressure intensification to theoretical pressure intensification;

$P_{spring}$ is that portion of the needle valve closing pressure which is attributable to its spring; and $P_{selected\ source}$ is the pressure of the selected source supplying fuel to the intensifier chamber.

42. The method of claim 41 wherein the needle valve closing pressure is adjusted by adjusting the pressure level of the selected source.

43. The method of metering fuel charges and injecting them into a combustion chamber of an internal combustion engine by supplying fuel through a solenoid valve and a pressure intensifier having an intensifier piston into an accumulator type fuel injector, such that the quantity of the fuel charge being metered and to be injected is adjusted by adjusting the valve "on" time and hence adjusting the actually utilized proportion of the pressure increase that is available from the pressure intensifier, and the commencement of injection is initiated by turning the valve off and reversing the movement of the intensifier piston.

44. The method of metering fuel charges and injecting them into a combustion chamber of an internal combustion engine by supplying fuel from a common rail source through a solenoid valve and a pressure intensifier into an accumulator type fuel injector, such that timing of the commencement of the injection is controlled by turning the valve off, and the quantity of the fuel charge being metered and injected is in linear relationship to the common rail source pressure.

45. The method of metering fuel charges and injecting them into a combustion chamber of an internal combustion engine by supplying fuel from a common rail source through a solenoid valve into an accumulator type fuel injector, such that timing of the injection is controlled by turning the valve off, and changes in the quantity of the fuel charge being metered and injected are controlled by controlling the common rail source pressure.

46. The method of metering fuel charges and injecting them into a plurality of combustion chambers of an internal combustion engine, comprising the steps of:

supplying liquid fuel from a common rail source to a plurality of solenoid valves associated with corresponding ones of the combustion chambers;

feeding the fuel under control of each solenoid valve and through a respectively associated pressure intensifier and through a check valve into a respectively associated accumulator type fuel injector;

turning each valve on at a substantial part of an engine cycle prior to the time when a fuel charge is to be injected into the associated combustion chamber, so as to allow a substantial time for the associated pressure intensifier to accomplish a build-up of the fuel pressure;

initiating the injection of a fuel charge into each combustion chamber by turning the associated valve off;

controlling the pressure of the common rail source so as to control the quantities of all the fuel charges; and adjusting the turn-on times of some of the valves relative to the others so as to adjust the proportion of the pressure multiplying capability of each pressure intensifier that is actually utilized, and thereby adjust the relative fuel quantities injected into the various combustion chambers of the engine.

47. The method of injecting fuel into a combustion chamber of an internal combustion engine, comprising the steps of:
 (a) selecting an accumulator type fuel injector having a fuel input, and characterized by the fact that the withdrawal of applied pressure from its input initiates the injection of a fuel charge;
 (b) placing said fuel injector in operative relation to the combustion chamber;
 (c) selecting an electronically controlled three-way valve for selectively admitting fuel into said accumulator type fuel injector;
 (d) coupling said valve to said injector;
 (e) coupling a source of liquid fuel to said valve; and
 (f) whenever it is desired to inject a fuel charge into the combustion chamber, applying an electronic control signal to said valve to open said valve a substantial portion of an engine cycle in advance of the time when injection is to commence; and
 (g) immediately prior to the time when injection is to commence, terminating said control signal so as to close said valve to pressure and open it to vent; whereby said accumulator type injector then causes the injection of the fuel charge into the combustion chamber to be initiated; the termination of injection of the fuel charge being controlled by said accumulator type fuel injector and not by said valve or said electronic control signal.

48. The method of claim 47 wherein the quantity of the fuel charge injected is controlled by adjusting the pressure of said fuel source.

49. The method of claim 47 wherein the quantity of the fuel charge injected is controlled by adjusting the interval of time during which said valve is open.

50. The method of claim 47, wherein the quantity of the fuel charge injected is controlled by adjusting both the pressure of said fuel source and the interval of time during which said valve is open.

51. The method of claim 47 wherein the quantity of the fuel charge injected is controlled either by adjusting the vent pressure or by adjusting the needle valve closing pressure.

52. The method of claim 47 which is applied to a multi-cylinder engine, wherein each accumulator type fuel injector is controlled by a respectively associated electronically controlled valve.

53. Apparatus for injecting fuel into a combustion chamber of an internal combustion engine, comprising, in combination:
 (a) an accumulator type fuel injector having a fuel input, said fuel injector being positioned in operative relation to the combustion chamber and characterized by the fact that the withdrawal of pressure from its input initiates the injection of a fuel charge;
 (b) an electronically controlled three-way solenoid valve having fuel supply and vent inputs, and a common port which is normally closed to supply and open to vent;
 (c) means coupling said common port of said valve to said fuel input of said injector;
 (d) a source of liquid fuel coupled to said fuel supply input of said valve;
 (e) means for supplying energizing current to said solenoid valve a substantial portion of an engine cycle in advance of the time when injection is to commence, so as to open said common port to supply and close it to vent; and
 (f) means for interrupting said energizing current immediately prior to the time when injection is to commence, thereby closing said valve to source pressure and opening it to vent so that said fuel injector then initiates the injection of the fuel charge;
 the termination of injection of the fuel charge being controlled by said accumulator type fuel injector and not by said valve.

54. Apparatus as claimed in claim 53 which additionally includes a pressure intensifier coupled between said common port of said valve and said fuel input of said injector, whereby said accumulator injector becomes charged to a pressure level which is a multiple of the source pressure.

55. Apparatus as claimed in claim 53 wherein said common port of said valve is coupled directly to said input of said injector, whereby said accumulator injector becomes charged to a pressure level which approaches the source pressure.

56. The method of operating an internal combustion engine having a normal operating cycle during which a single fuel charge is injected once per cycle into each combustion chamber of the engine, comprising the steps of:
 (a) generating a periodically repeated sequence of electronic timing signals;
 (b) sensing the revolution of a revolving shaft of the engine;
 (c) in response to the sensed shaft revolutions, synchronizing said sequence of electronic timing signals with a normal operating cycle of the engine;
 (d) then utilizing said sequence of electronic timing signals to control both the injection of fuel charges into the combustion chambers of the engine, and the ignition of said fuel charges, so as to maintain said normal operating cycle of the engine;
 (e) then altering said sequence of electronic timing signals so that individual injection and ignition cycles are selectively eliminated from the normal sequence of events to improve efficiency, and to control power, speed, torque impulses, exhaust emissions and other engine characteristics;

whereby it is possible to maintain substantially the same size of fuel charge supplied to each combustion chamber of the engine while decreasing the number and frequency of such fuel charges, thereby reducing the total fuel consumption of the engine while maintaining its combustion efficiency.

57. The method of claim 56 in which the fuel is injected into the intake port or other passage related to the combustion chamber.

58. Apparatus for injecting fuel into a combustion chamber of an internal combustion engine, comprising, in combination:

(a) an accumulator type fuel injector having a fuel input, said fuel injector being positioned in operative relation to the combustion chamber and characterized by the fact that the withdrawal of pressure from its input initiates the injection of a fuel charge;

(b) an electronically controlled three-way solenoid valve having fuel supply and vent inputs, and a common port which is normally closed to supply and open to vent.

(c) a source of liquid fuel at a predetermined common supply pressure, coupled to said fuel supply input of said valve;

(d) means coupling said common port of said valve directly to said fuel input of said injector;

(e) means for supplying energizing current to said solenoid valve a substantial portion of an engine cycle in advance of the time when injection is to commence, so as to open said common port to supply and close it to vent;

(f) means for interrupting said energizing current immediately prior to the time when injection is to commence, thereby closing said valve to source pressure and opening it to vent so that said fuel injector then initiates the injection of the fuel charge; and (g) means for adjusting at least one of the pressure level of said common supply pressure, and the time interval during which said solenoid valve is open, in order to correspondingly adjust the magnitude of the fuel charge to be injected into said cylinder;

the termination of injection of the fuel charge being controlled by said accumulator type fuel injector and not by said valve, and the quantity of fuel to be injected being controlled by the peak pressure of the accumulator chamber and the inherent closing pressure of said accumulator type fuel injector.

59. Apparatus as in claim 58 wherein said solenoid valve is of the ball or poppet valve type.

60. Apparatus as in claim 58 wherein said solenoid valve includes:

a plunger, a first ball at the end of said plunger, a plunger extension, and a second ball at the end of said plunger extension;

each of said balls being captured for reciprocating movement to accomplish a valving action;

said inlet port communicating with one of said balls, said drain port communicating with the other of said balls, and said common outlet port being located intermediate to said balls and communicating with both of them.

61. The method of metering a fuel charge and injecting it into a combustion chamber of an internal combustion engine by:

(a) feeding fuel from a common rail source through a pathway controlled by a solenoid valve and through a check valve into an accumulator type fuel injector for a substantial portion of an engine cycle before the charge is to be injected;

(b) turning off the solenoid valve in order to close the pathway and discontinue the feed of fuel and concurrently initiate the injection of the fuel charge into the combustion chamber;

(c) continuing the fuel injection until the injection event is terminated by the spring closing action of the injector so that the quantity of the injected charge is determined by the rail pressure; and (d) then adjusting the rail pressure in order to adjust the quantity of the next succeeding fuel charge.

62. The method of claim 61 wherein the fuel is fed directly through the solenoid valve to the check valve.

63. In a diesel fuel injection system, a unit injector assembly comprising, in combination:

a pressure intensifier having an intensifier piston, an input end with a low pressure chamber, and an output end with a high pressure chamber;

means for supplying liquid fuel from an adjustable common rail pressure source through a check valve to said high pressure chamber;

a three-way solenoid valve having a fuel inlet adapted to be coupled to said common rail pressure source, a common outlet coupled to said low pressure chamber of said intensifier, and a drain output, said solenoid valve normally being open to the drain output;

electrical control means for selectively energizing said solenoid valve so as to open said valve to its fuel inlet and close said valve to drain, and hence to apply pressure through said hydraulic intensifier to said high pressure chamber so that said fuel supply check valve becomes closed;

an accumulator type fuel injector having an accumulator chamber and an outlet valve;

a non-return valve coupling said high pressure chamber of said hydraulic intensifier to said accumulator chamber;

said electrical control means being operable for keeping said solenoid valve open throughout a time interval which is longer than the duration of an injection event, so that the fuel pressure in said high pressure chamber of said hydraulic intensifier increases exponentially towards a selected multiple of said common rail pressure, and is at the same time transmitted through said non-return valve into said accumulator injector; and said electrical control means also being operable, whenever a fuel charge is to be injected, for closing said solenoid valve to inlet and opening it to drain, thereby reversing the direction of said intensifier piston, relieving the pressure in said high pressure chamber, and causing said non-return valve to close;

whereby said outlet valve opens and the injection of the fuel charge is then initiated by said accumulator injector and continues until terminated by the spring closing action of the injector, with the result that the mass of the injected fuel charge bears a linear relationship to the then existing pressure level of said common rail pressure.

64. The method of metering fuel charges and injecting them into a plurality of combustion chambers of an engine by
(a) providing fuel from a common rail source,
(b) for each combustion chamber, transferring fuel from the common rail source under control of a separate solenoid valve through a separate pressure intensifier and a separate check valve into a separate accumulator type fuel injector,
(c) selectively turning each solenoid valve off in order to isolate the associated accumulator type injector from the common rail source and thereby initiate the injection of a fuel charge into the associated cylinder, and
(d) adjusting the common rail source pressure from time to time so as to change the fuel charge quantities being injected into all the combustion chambers in linear relationship to said common rail source pressure.

65. The method of metering a fuel charge and injecting it into a combustion chamber of an internal combustion engine by:
(a) feeding fuel from a common rail source through a pathway including a pressure intensifier that is controlled by a solenoid valve and through a check valve into an accumulator type fuel injector for a substantial portion of an engine cycle before the charge is to be injected;
(b) turning off the solenoid valve in order to close said pathway and discontinue the infeed of fuel and concurrently initiate the injection of the fuel charge into the combustion chamber;
(c) continuing the fuel injection until the injection event is terminated by the spring closing action of the injector so that the quantity of the injected charge is determined by the rail pressure; and
(d) then adjusting the rail pressure in order to adjust the quantity of the next succeeding fuel charge.

66. The method of claim 65 wherein the pressure intensifier utilizes a piston, and the turning off of the solenoid valve reverses the direction of travel of the piston so as to close the check valve.

67. A pressure-metered fuel injection method comprising the steps of
(a) selecting a fuel source having a controllable pressure level,
(b) supplying liquid fuel through a fluid pathway and a non-return valve to an accumulator injector,
(c) under control of the source pressure, allowing fuel to flow through said pathway and through the non-return valve into the accumulator injector throughout a time interval which is of sufficient duration that the fuel pressure inside the accumulator injector then becomes essentially a function of the source pressure rather than of the parameters of the pathway,
(d) then closing off and venting the pathway so that the non-return valve closes, and the injector injects a fuel charge whose mass is linearly related to the source pressure, and
(e) thereafter adjusting the source pressure so as to adjust the mass of the next succeeding fuel charge.

68. The method of operating an internal combustion engine having a plurality of combustion chambers, comprising the steps of:
(a) generating a sequence of electronic timing signals to provide a timing cycle,
(b) acquiring an electrical signal from a shaft of the engine for synchronizing the sequence of timing signals with the engine operation,
(c) during each sequence, applying one of the timing signals to a unit injector assembly associated with each of the combustion chambers for initiating the injection of fuel into the associated chamber,
(d) continuously repeating the sequence of electronic timing signals so as to operate the engine through successive firing cycles, and
(e) then modifying the repetition of the sequence of timing signals so as to selectively eliminate selected firing cycles of the engine.

* * * * *